(12) United States Patent
Raj et al.

(10) Patent No.: US 12,374,224 B2
(45) Date of Patent: Jul. 29, 2025

(54) VEHICLE CONTROL IN GEOGRAPHICAL CONTROL ZONES

(71) Applicant: SONY GROUP CORPORATION, Tokyo (JP)

(72) Inventors: Ranjeet Ranjan Raj, Bangalore (IN); Madhvesh Sulibhavi, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 568 days.

(21) Appl. No.: 17/755,194

(22) PCT Filed: Oct. 27, 2020

(86) PCT No.: PCT/IB2020/060065
§ 371 (c)(1),
(2) Date: Apr. 22, 2022

(87) PCT Pub. No.: WO2021/084420
PCT Pub. Date: May 6, 2021

(65) Prior Publication Data
US 2022/0383748 A1 Dec. 1, 2022

(30) Foreign Application Priority Data
Oct. 29, 2019 (IN) .............................. 201911043742

(51) Int. Cl.
*G08G 1/16* (2006.01)
*B64U 101/20* (2023.01)
(Continued)

(52) U.S. Cl.
CPC ......... *G08G 1/164* (2013.01); *G01C 21/3415* (2013.01); *G01C 21/3461* (2013.01);
(Continued)

(58) Field of Classification Search
CPC ........ G08G 1/164; G08G 1/052; G08G 1/056; G08G 1/096716; G08G 1/096725;
(Continued)

(56) References Cited

U.S. PATENT DOCUMENTS 10,235,882 B1    3/2019  Aoude et al.
10,479,274 B2 *  11/2019 Park ....................... G08G 1/162
(Continued)

FOREIGN PATENT DOCUMENTS

CA     3094275 A1    9/2019
CN     1782665 A     6/2006
(Continued)

OTHER PUBLICATIONS

International Search Report and Written Opinion of PCT Application No. PCT/IB2020/060065, issued on Mar. 19, 2021, 16 pages of ISRWO.

*Primary Examiner* — Luis A Martinez Borrero
(74) *Attorney, Agent, or Firm* — CHIP LAW GROUP

(57) ABSTRACT

A control system and a method for vehicle control in geographical control zones is provided. The control system receives traffic information, including a plurality of image frames of a group of moving objects in a geographical control zone and generates a set of images frames of a first moving object of the group of moving objects based on application of a trained Neural Network (NN) model on the received traffic information. The generated set of image frames corresponds to a set of likely positions of the first moving object at a future time instant. The control system predicts the unsafe behavior of the first moving object based on the generated set of image frames and generates first control information, including an alternate route for a first vehicle in the geographical control zone based on the
(Continued)

predicted unsafe behavior. The first vehicle is controlled based on the generated first control information.

22 Claims, 10 Drawing Sheets

(51) Int. Cl.
*B64U 101/30* (2023.01)
*G01C 21/34* (2006.01)
*G08G 1/052* (2006.01)
*G08G 1/056* (2006.01)
*G08G 1/0967* (2006.01)

(52) U.S. Cl.
CPC ............ *G08G 1/052* (2013.01); *G08G 1/056* (2013.01); *G08G 1/096716* (2013.01); *G08G 1/096725* (2013.01); *G08G 1/096775* (2013.01); *G08G 1/096783* (2013.01); *G08G 1/096791* (2013.01); *G08G 1/166* (2013.01); *B64U 2101/20* (2023.01); *B64U 2101/30* (2023.01)

(58) Field of Classification Search
CPC ....... G08G 1/096775; G08G 1/096783; G08G 1/096791; G08G 1/166; G01C 21/3415; G01C 21/3461; B64U 2101/30; B64U 2101/20
USPC ........................................................ 701/117
See application file for complete search history.

(56) References Cited

U.S. PATENT DOCUMENTS

| | | | | |
|---|---|---|---|---|
| 10,755,115 | B2* | 8/2020 | Avidan | G06V 20/58 |
| 10,871,783 | B2* | 12/2020 | Julian | G06T 7/246 |
| 11,200,795 | B2* | 12/2021 | Awai | G08G 1/01 |
| 11,475,677 | B2* | 10/2022 | Avidan | G08G 1/166 |
| 11,508,238 | B2* | 11/2022 | Sui | G05D 1/0276 |
| 11,521,493 | B2* | 12/2022 | Vaughn | G08G 1/166 |
| 11,531,109 | B2* | 12/2022 | Conde | G08G 1/096725 |
| 11,630,998 | B2* | 4/2023 | Khan | G01S 13/931 701/2 |
| 11,636,307 | B2* | 4/2023 | Urtasun | G08G 1/0112 701/25 |
| 11,741,696 | B2* | 8/2023 | Julian | G06V 10/764 701/25 |
| 11,807,234 | B2* | 11/2023 | Hotta | B60W 30/0956 |
| 12,008,454 | B2* | 6/2024 | Urtasun | G08G 1/20 |
| 2017/0036673 | A1* | 2/2017 | Lee | A61B 5/18 |
| 2017/0267256 | A1* | 9/2017 | Minster | B60W 40/09 |
| 2017/0327035 | A1 | 11/2017 | Keiser | |
| 2017/0372151 | A1 | 12/2017 | Divekar | |
| 2018/0068206 | A1* | 3/2018 | Pollach | G06V 20/56 |
| 2018/0173240 | A1 | 6/2018 | Fang et al. | |
| 2018/0335785 | A1* | 11/2018 | Miller | G08G 1/017 |
| 2018/0370502 | A1 | 12/2018 | Wang et al. | |
| 2019/0025853 | A1* | 1/2019 | Julian | G06V 10/82 |
| 2019/0065951 | A1* | 2/2019 | Luo | G08G 1/166 |
| 2019/0073545 | A1* | 3/2019 | Dolgov | B60Q 9/00 |
| 2019/0088148 | A1* | 3/2019 | Jacobus | H04L 67/125 |
| 2019/0094882 | A1* | 3/2019 | Kim | G05D 1/0257 |
| 2019/0129436 | A1* | 5/2019 | Sun | G06N 3/08 |
| 2019/0147260 | A1* | 5/2019 | May | B60W 50/14 382/103 |
| 2019/0171208 | A1* | 6/2019 | Magalhães de Matos | G06N 20/00 |
| 2019/0179328 | A1 | 6/2019 | Movert et al. | |
| 2019/0204843 | A1 | 7/2019 | Fang et al. | |
| 2019/0205115 | A1* | 7/2019 | Gomes | H04W 4/50 |
| 2019/0205667 | A1* | 7/2019 | Avidan | G06F 18/28 |
| 2019/0287394 | A1 | 9/2019 | Aoude et al. | |
| 2019/0287395 | A1 | 9/2019 | Aoude et al. | |
| 2019/0287401 | A1 | 9/2019 | Aoude et al. | |
| 2019/0287402 | A1 | 9/2019 | Aoude et al. | |
| 2019/0287403 | A1 | 9/2019 | Aoude et al. | |
| 2019/0294966 | A1* | 9/2019 | Khan | G01S 13/00 |
| 2019/0325754 | A1 | 10/2019 | Aoude et al. | |
| 2019/0392712 | A1* | 12/2019 | Ran | G08G 1/0116 |
| 2020/0004242 | A1* | 1/2020 | Kim | B60W 30/146 |
| 2020/0249683 | A1* | 8/2020 | Rosales | G05D 1/617 |
| 2020/0262423 | A1* | 8/2020 | Oboril | G08G 1/161 |
| 2020/0290638 | A1* | 9/2020 | Damnjanovic | G08G 1/164 |
| 2020/0294394 | A1* | 9/2020 | Guo | G08G 1/096783 |
| 2020/0326203 | A1* | 10/2020 | Lund | G08G 1/04 |
| 2020/0342242 | A1* | 10/2020 | Avidan | G06N 3/045 |
| 2020/0388156 | A1 | 12/2020 | Aoude et al. | |
| 2020/0409389 | A1* | 12/2020 | Julian | G06V 10/764 |
| 2021/0125076 | A1* | 4/2021 | Zhang | G08G 1/0137 |
| 2021/0331701 | A1* | 10/2021 | Hur | H04W 4/44 |
| 2022/0105926 | A1* | 4/2022 | Zhang | G08G 1/162 |
| 2022/0126864 | A1* | 4/2022 | Moustafa | H04W 4/46 |
| 2022/0198930 | A1* | 6/2022 | Ookuma | G08G 1/04 |
| 2023/0394810 | A1* | 12/2023 | Julian | G06V 20/56 |

FOREIGN PATENT DOCUMENTS

| | | |
|---|---|---|
| CN | 104574953 A | 4/2015 |
| CN | 106873580 A | 6/2017 |
| CN | 107358816 A | 11/2017 |
| CN | 107539313 A | 1/2018 |
| CN | 108447291 A | 8/2018 |
| CN | 108475057 A | 8/2018 |
| CN | 109117709 A | 1/2019 |
| CN | 109804223 A | 5/2019 |
| CN | 109841088 A | 6/2019 |
| CN | 110027563 A | 7/2019 |
| CN | 110072749 A | 7/2019 |
| CN | 110171414 A | 8/2019 |
| CN | 110546696 A | 12/2019 |
| CN | 112154492 A | 12/2020 |
| DE | 102017109513 A1 | 11/2017 |
| EP | 3356900 A1 | 8/2018 |
| EP | 3495220 A1 | 6/2019 |
| EP | 3753001 A1 | 12/2020 |
| GB | 2552241 A | 1/2018 |
| JP | 6684346 B2 | 4/2020 |
| KR | 20090130977 A | 12/2009 |
| KR | 10-2018-0088789 A | 8/2018 |
| RU | 2017115671 A | 11/2018 |
| WO | 2018/118112 A1 | 6/2018 |
| WO | 2019/180551 A1 | 9/2019 |

* cited by examiner

VEHICLE CONTROL IN GEOGRAPHICAL CONTROL ZONES

CROSS REFERENCE TO RELATED APPLICATIONS

This application is a U.S. National Phase of International Patent Application No. PCT/IB2020/060065 filed on Oct. 27, 2020, which claims priority benefit of Indian Patent Application No. IN 201911043742 filed in the Indian Patent Office on Oct. 29, 2019. Each of the above-referenced applications is hereby incorporated herein by reference in its entirety.

FIELD

Various embodiments of the disclosure relate to self-driving technology. More specifically, various embodiments of the disclosure relate to a system and a method for vehicle control in geographical control zones and prediction of future scenes in real time.

BACKGROUND

Recent advancements in self-driving technology have led to development of various techniques to provide driving assistance to self-driving vehicles. Typically, a self-driving vehicle may rely on various onboard sensors to learn and determine the surrounding environment and to take driving decisions in real time or near real time. Such sensors, for example, image sensors, Light Detection and Ranging (LiDAR), or Radars, have a limited Field of View. This may bear relevance, especially when the surrounding environment includes occluding structures or intersections. Also, in cases where the sensors get dirty or malfunction, the self-driving vehicle may have to either rely on a user input or other functioning sensors onboard the vehicle. This may, for example, potentially affect riding experience of occupants, risk safety of the occupants, or may result in a performance loss, e.g., a large deviation from a set Estimated-Time-of-Arrival (ETA).

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for vehicle control in geographical control zones are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
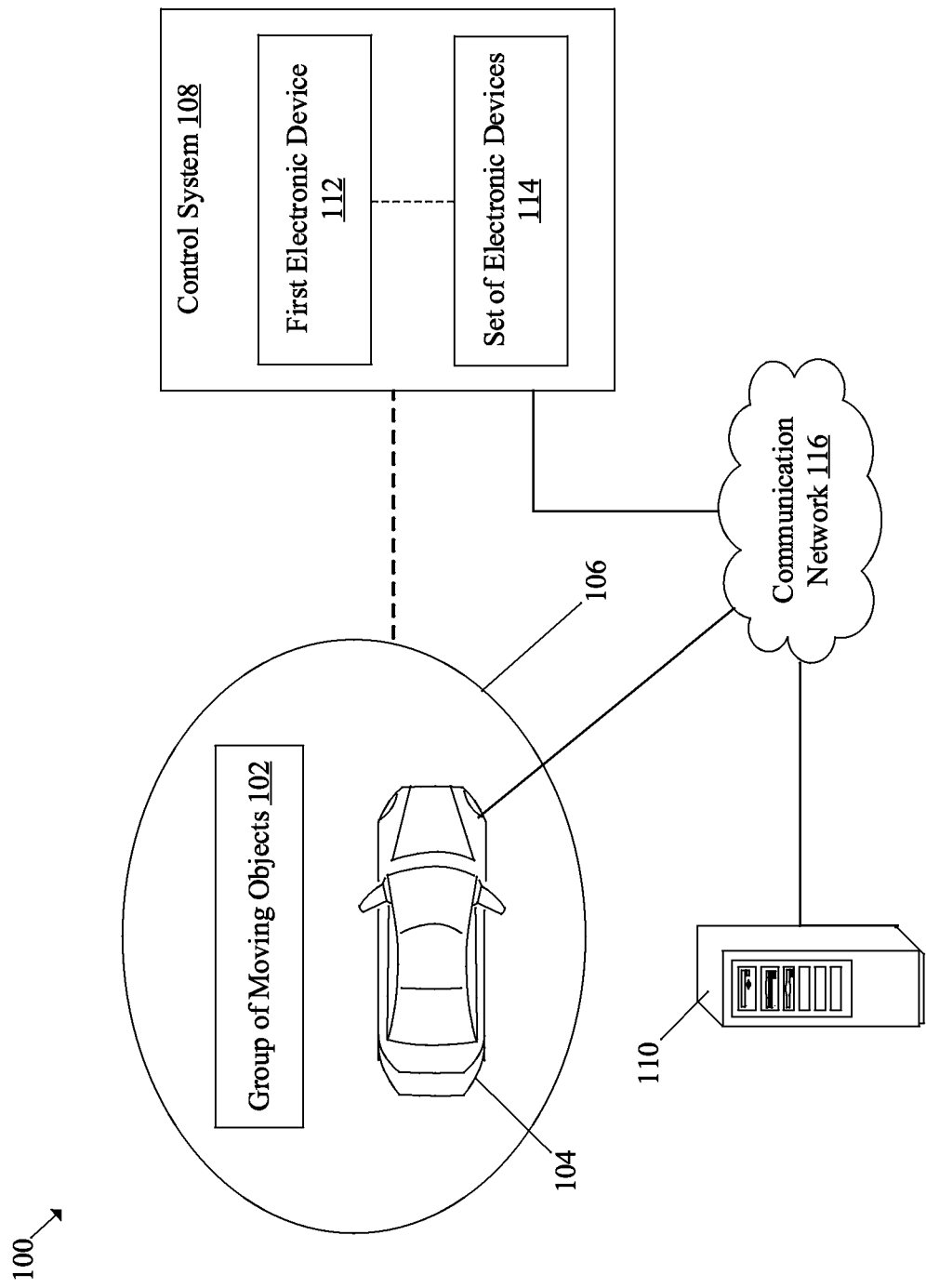
FIG. 1 is a diagram that illustrates an exemplary environment for vehicle control in geographical control zones, in accordance with an embodiment of the disclosure.

The following described implementations may be found in the disclosed system and method for vehicle control in geographical control zones. Exemplary aspects of the disclosure provide a control system. The disclosed control system acts as a predictive vehicle movement system, which helps vehicles with different levels of automation to avoid certain situations in real time or near real time, for example, collisions, rollovers, unwanted delays, traffic jam, violation of traffic rules. Such situations may arise due to unsafe behavior of certain moving objects. For a vehicle with a certain level of automation, the disclosed control system may generate predictive video frames to indicate likely positions of moving object(s) and analyze other information, e.g., GNSS information/positioning information, speed, motion, traffic rules, etc., of moving object(s). This may help to obtain an improved prediction of unsafe behavior of moving object(s) ahead of time, especially for moving object(s) which fall off the field of view of a registered vehicle (which requires assistance). With the generation of predictive video frames, the disclosed control system may offer a reduced temporal redundancy in continuous image frame analysis and may predict vehicle movement (e.g., unsafe behavior), without attempting to reconstruct moving object(s) in real pixel information.

The disclosed control system may measure traffic conditions on a route in real time and inform vehicles about traffic conditions on the route. Additionally, based on prediction of unsafe behavior, the disclosed control system may suggest an alternate route to such vehicles to avoid certain situations, e.g., collisions, rollover, unwanted delays, traffic jam, violation of traffic rules, and the like. The disclosed control system may also prioritize movement of such vehicles in a geographical control zone for such vehicles based on predictions of unsafe behavior of moving object(s), traffic conditions, traffic violations, and the like.

The disclosed control system may monitor movement of objects, such as vehicles, animals, pedestrians, debris, sharp objects, and weapons. Based on such movement monitoring, the disclosed control system may predict a safe or unsafe behavior of such objects and take preemptive maneuvers ahead of time to ensure safety of occupants in the vehicle. The disclosed control system may also monitor movement of objects which are nearby (in field of view) or far away (at intersection points or off the field of view) for certain unsafe behavior, e.g., a violation of a traffic rule for safety of the occupants. The disclosed control system may also track behavior of drivers or occupants of the vehicle and may override a driver's intention in case of social concerns (terrorist intention to mass killing, own car damage for insurance claims, and the like). The disclosed control system also makes use of drones fitted on vehicles to enable such vehicles to navigate around area/moving objects which appear invisible to such vehicle, especially in case of, for example, road turnings, difficult weather conditions, low vision, or incorrect trajectory or route.

FIG. 1 is a diagram that illustrates an exemplary environment for vehicle control in geographical control zones, in accordance with an embodiment of the disclosure. With reference to FIG. 1, there is shown an exemplary environment 100. The exemplary environment 100 may include a group of moving objects 102 and a first vehicle 104 in a geographical control zone 106. The exemplary environment 100 may further include a control system 108 and a server 110. The control system 108 may include a first electronic device 112. Additionally, in some embodiments, the control system 108 may include a set of electronic devices 114. The exemplary environment 100 may further include a communication network 116 which may be established among the first vehicle 104, the server 110, the first electronic device 112, and the set of electronic devices 114.

The group of moving objects 102 may be objects which appear within a detectable range of at least one electronic device of the set of electronic devices 114. Additionally, or alternatively, from objects detected in the geographical control zone 106, the group of moving objects 102 may be selected as objects which move within a region of interest of the geographical control zone 106. The region of interest may be, for example, a section of a road, a network of interconnected roads, a specific lane, or an intersection of roads. Additionally, or alternatively, from objects detected in the geographical control zone 106, the group of moving objects 102 may be selected as objects which belong to at least one object type of a specific group of object types. The specific group of object types may include, for example, a vehicle, a pedestrian, a debris, and the like. Examples of the group of moving objects 102 may include, but are not limited to, moving vehicles, pedestrians, animals, flying debris, or a combination thereof.

The first vehicle 104 may be configured to operate in accordance with a particular level of automation, for example, as one of the different levels (e.g., 0, 1, 2, 3, 4, and 5) of automation defined by National Highway Traffic Safety Administration (NHTSA). Based on the level of automation, the first vehicle 104 may be one of a semi-autonomous vehicle, a fully autonomous vehicle, or a non-autonomous vehicle. Examples of the first vehicle 104 may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. Further examples of the first vehicle 104 may include, but are not limited to, a fossil fuel-based vehicle, an electric propulsion-based vehicle, a hydrogen fuel-based vehicle, a solar-powered vehicle, and/or a vehicle powered by other forms of alternative energy sources.

In certain instances, the first vehicle 104 may include a functionality or capability to drive itself from a starting point to a destination point based on various vehicle technologies and sensors, including adaptive cruise control, active steering, anti-lock braking systems (brake by wire), Global Navigation Satellite System (GNSS) navigation technology, lasers, cameras, radar, or Light Detection and Ranging (LIDAR) system(s).

The geographical control zone 106 may be established to be a portion of land with a defined boundary. For example, the portion of land may include roads, intersections, crossings, sidewalks, highways, interchanges, bridges, junctions, or other forms of roadways or motorways. The geographical control zone 106 may be established to monitor the group of moving objects 102 for an unsafe behavior (or a potential unsafe behavior) to provide driving assistance to the first vehicle 104 in the geographical control zone 106. In certain instances, the geographical control zone 106 may be established when the first vehicle 104 is detected to be within communication range of the set of electronic devices 114.

The control system 108 may comprise suitable logic, circuitry, and interfaces that may be configured to provide driving assistance to the first vehicle 104 while the first vehicle 104 passes through one or more geographical control zones. The control system 108 may be configured to monitor the unsafe behavior of at least one moving object of the group of moving objects 102 in the geographical control zone 106. Additionally, in certain instances, while the first vehicle 104 is in the geographical control zone 106, the control system 108 may be configured to assist the first vehicle 104 to reach to a destination point and/or to ensure safety of the first vehicle 104, occupant(s) of the first vehicle 104, or other objects in vicinity of the first vehicle 104. Examples of the control system 108 may include, but are not limited to, a vehicle, or a network of vehicles, a traffic management system, a server, or a roadside computing infrastructure. In certain embodiments, the control system 108 may be a part of an Advance Driver-Assistance System (ADAS) of the first vehicle 104.

The server 110 may comprise suitable logic, circuitry, and interfaces that may be configured to act as a data store for traffic information of the group of moving objects 102. Additionally, as a preemptive measure, the server 110 may be configured to collect real time or near real time information of events which may potentially occur or may have occurred in the geographical control zone 106 or at any location in the current travel route of the first vehicle 104. Such events may potentially affect a riding experience or may pose an imminent harm to the rider of the first vehicle 104. Example of such events may include, for example, blockades, accidents, terrorist attacks, natural disasters, riots, or any form of violence.

Additionally, or alternatively, the server 110 may be configured to train a neural network (NN) model on a set of test images of a group of test objects so as to generate images which predict an unsafe behavior of at least one test object in the group of test objects. The server 110 may be implemented as a cloud server which may execute operations through web applications, cloud applications, HTTP requests, repository operations, file transfer, and the like. Other examples of the server 110 may include, but are not limited to, an in-vehicle server, a database server, a file server, a web server, a media server, an application server, a mainframe server, a cloud server, or other types of servers.

In certain embodiments, the server 110 may be implemented as a plurality of distributed cloud-based resources by use of several technologies that are well known to those ordinarily skilled in the art. A person with ordinary skill in the art will understand that the scope of the disclosure may not be limited to implementation of the server 110 and the first electronic device 112 as separate entities. In certain embodiments, functionalities of the server 110 may be incorporated in its entirety or at least partially in the first electronic device 112, without a departure from the scope of the disclosure.

The first electronic device 112 may comprise suitable logic, circuitry, and interfaces that may be configured to receive traffic information of the group of moving objects 102 and predict an unsafe behavior of a first moving object based on the received traffic information. Additionally, the first electronic device 112 may be configured to generate first control information, including an alternate route for the first vehicle 104, based on the predicted unsafe behavior of the first moving object. Examples of the first electronic device 112 may include, but is not limited to, a vehicle, an in-vehicle Electronic Control Unit (ECU), an in-vehicle camera, an external vehicle camera, a Road Side Unit (RSU), a Vehicle-to-Infrastructure (V2I) communication device, or a camera drone. In certain embodiments, the first electronic device 112 may be a part of an ECU or the ADAS of the first vehicle 104.

Each of the set of electronic devices 114 may comprise suitable logic, circuitry, and interfaces that may be configured to collect the traffic information which includes a plurality of image frames of the group of moving objects 102 in the geographical control zone 106. Additionally, in certain instances, each of the set of electronic devices 114 may form a peer-to-peer (P2P) network and share the collected traffic information with the first electronic device 112 and among one or more electronic devices of the set of electronic devices 114. The first vehicle 104 may be controlled based on the generated first control information. In certain embodiments, the set of electronic devices 114 may be actively deployed as a traffic monitoring device in the geographical control zone 106. In certain other embodiments, at least one of the set of electronic devices 114 may be part of a moving vehicle which enters the geographical control zone 106 and acts a traffic monitoring device for other vehicles (e.g., the first vehicle 104). In such instances, such an electronic device may be removed from the set of electronic devices 114 as the moving vehicle leaves the geographical control zone 106.

Examples of the set of electronic devices 114 may include, but are not limited to, an in-vehicle ECU, an in-vehicle camera, an external vehicle camera, a RSU, a V2I communication device, and a camera drone. Further examples of the set of electronic devices 114 may include, but are not limited to, traffic signals, roadside beacons, and wireless access points.

The communication network 116 may include a communication medium through which the first vehicle 104, the server 110, the first electronic device 112, and the set of electronic devices 114 may communicate with each other. The communication network 116 may be a communication medium through which different internal and peripheral electronic components of the first vehicle 104 may communicate with the server 110, the first electronic device 112, and the set of electronic devices 114. The communication network 116 may be established based on one or more communication standards/protocols, such as Controller Area Network (CAN) protocols, Local Interconnect Network (LIN) protocol, Media Oriented Systems Transport (MOST) protocol, Vehicle Area Network (VAN), or FlexRay standard. Examples of the communication network 116 may include, but are not limited to, Internet, Internet-based mobile ad hoc networks (IMANET), a cellular network, such as a 3G, 4G, or 5G network, a cloud network, and/or a Wide Area Network (WAN).

Various devices in the exemplary environment 100 may connect to the communication network 116 in accordance with various wireless communication protocols. Examples of such wireless communication protocols may include, but are not limited to, IEEE 802.11, 802.11x, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), LTE, File Transfer Protocol (FTP), ZigBee, EDGE, Li-Fi, and/or other wireless communication protocols.

In operation, each electronic device of the set of electronic devices 114 may be configured to collect traffic information, including but not limited to, a plurality of image frames of the group of moving objects 102 in the geographical control zone 106. As an example, for an intersection of two roads, there may be two electronic devices, i.e. a V2I device on a first road and a vehicle on a second road. While the V2I device may collect a first portion of the traffic information of moving objects on the first road, the vehicle parked on the second road may collect remaining portion of the traffic information of moving objects on the second road.

In certain embodiments, the collected traffic information may further include GNSS information for a plurality of locations in the geographical control zone 106. The GNSS information may include, for example, vehicle locations, specific routes, specific intersections, traffic conditions on the specific routes, turns on the specified routes, accidents on the specific routes, and the like. Additionally, for a moving vehicle as one of the group of moving objects 102, such moving vehicle share frequent updates of time, position, speed, direction, or current travel route to one or more of the set of electronic devices 114. The traffic information for a specific route may be provided by a specific electronic device of the set of electronic devices 114. In certain instances, the collected traffic information may be shared with a master node, for example, the first electronic device 112.

In some embodiments, the control system 108 may include a drone, as one of the set of electronic devices 114, on the first vehicle 104. The first electronic device 112 may be configured to dispatch the drone to a location of the first moving object of the group of moving objects 102. Additionally, or alternatively, the first electronic device 112 may be configured to detect a user discomfort level for the first vehicle 104 and dispatch the drone further based on the detected user discomfort level. The first moving object may be, for example, absent from a field of view (FOV) of the first vehicle 104. The drone may be configured to capture the traffic information of the first moving object and share the captured traffic information with the first electronic device 112, via the communication network 116.

At any given time in the current travel route of the first vehicle 104, the first vehicle 104 may enter in a communication range of the control system 108, for example, the first electronic device 112 and/or the set of electronic devices 114. The first electronic device 112 may be configured to detect the first vehicle 104 based on the first vehicle 104 being in the communication range of the control system 108. The first electronic device 112 may be further configured to receive, from the detected first vehicle 104, an input corresponding to an acceptance to set up the geographical control zone 106 which spans up to a defined distance. Such input may be, for example, a user input, a handshake, a packet signed by a uniquely identifiable signature, an authentication token, or an access credential to authenticate the identity of a user (or an occupant) of the first vehicle 104. The first electronic device 112 may be further configured to establish the geographical control zone 106 around the detected first vehicle 104 based on the received input.

The first electronic device 112 may be further configured to receive the traffic information (e.g., the collected traffic information) from one or more electronic devices of the set of electronic devices 114. The traffic information may include the plurality of image frames of the group of moving objects 102 in the geographical control zone 106. In certain instances, the traffic information may further include one or more of, for example, location information of different moving and/or non-moving objects, 3D models or 3D scanning data of environment surrounding the one or more electronic devices, safety or events information associated certain locations in the current travel route of the first vehicle 104, and the like.

By way of example, the group of moving objects 102 may include vehicles which may move on same or different lanes of a road or a different road, or a different direction on the road, with respect to the first vehicle 104. At any time-instant, a few vehicles may be in a direct field of view of the first vehicle 104, while others vehicles may be absent or occluded from the field of view of the first vehicle 104. In order to collect the traffic information of the group of moving objects 102, one or more electronic devices of the set of electronic devices 114 may be deployed or assigned to monitor and collect portions of the traffic information from different regions surrounding respective locations of the one or more electronic devices in the geographical control zone 106. Once collected, the one or more electronic devices may mutually share the collected portions of the traffic information with each other and/or with a master node.

The first electronic device 112 may be further configured to generate a set of images frames of a first moving object of the group of moving objects 102 based on application of a trained NN model on the received traffic information. The first moving object may correspond to one of a vehicle (autonomous or non-autonomous), pedestrian, an animal, an aerial vehicle, a flying debris, and the like. The generated set of image frames may correspond to a set of likely positions of the first moving object at a future time instant. The plurality of image frames may be provided as an input to an initial layer of the trained NN model, which may be stored on the first electronic device 112. The trained NN model may produce the set of image frames as an output of a final NN layer of the trained NN model.

The first electronic device 112 may be further configured to predict an unsafe behavior of the first moving object based on the generated set of image frames. The unsafe behavior of the first moving object may be predicted while the first moving object is absent from a field of view (FOV) of the first vehicle. Additionally, or alternatively, the unsafe behavior of the first moving object may be predicted while the first moving object is in a field of view (FOV) of the first vehicle. By way of example, in case of a pedestrian or a vehicle as the first moving object, the predicted unsafe behavior may correspond to a violation of traffic rule, for example, jaywalking, i.e. crossing a road while the traffic signal is still red for pedestrians or a situation which can lead to a damage (e.g., a crash or a collision) with the first vehicle 104.

The predicted unsafe behavior may correspond to a violation of a traffic rule by the first moving object in the geographical control zone 106. For example, the first moving object may violate the traffic rule as the first moving object may be supposed to ride on the right side of the road. Additionally, or alternatively, the predicted unsafe behavior may correspond to, for example, a sudden flash of lights, an unrecognized behavior of animals, noisy and distracting objects, and the like. It should be noted that the prediction of the unsafe behavior may change from one geographical control zone to another geographical control zone and from time to time based on changes in traffic rules in different control zones and update of traffic rules in due course of time for the geographical control zone 106.

In certain embodiments, the first electronic device 112 may be further configured to determine motion information of the group of moving objects 102 based on the received traffic information. The motion information of the group of moving objects 102 may include one or more of, for example, a moving direction, a moving speed, a driving pattern, a driving lane, a driving side of the road, and the like. In such instances, the unsafe behavior of the first moving object may be predicted further based on the determined motion information.

The first electronic device 112 may be further configured to generate first control information based on the predicted unsafe behavior. The first control information may include an alternate route for the first vehicle 104. The alternate route may lead to same destination point where the first vehicle 104 intends to reach. Additionally, the first control information may include, for example, control signals for different vehicle control parameters of the first vehicle 104 so as to allow the first vehicle 104 to switch to the alternate route and/or avoid a collision with the first moving object. The control signals may correspond to, for example, steering controls, braking controls, acceleration controls, route change, safety measures for the first vehicle 104, and the like. The first vehicle 104 may be controlled based on the generated first control information. The first electronic device 112 may apply brakes, accelerate, de-accelerate, and/or steer the first vehicle 104 based on the generated first control information so as to avoid situations, for example, a collision with one of the group of moving objects 102. Alternatively, in certain embodiments, the first electronic device 112 may be configured to directly control the first vehicle 104 based on the generated first control information. For example, in such instances, the first electronic device 112 may be either a part of the ADAS of the first vehicle 104, part of another vehicle, or a road side electronic infrastructure in the geographical control zone 106.

In accordance with an embodiment, the first electronic device 112 may be configured to register a set of vehicles, including the first vehicle 104 on a control network, for example, the communication network 116. The registered set of vehicles may be present in the geographical control zone 106. The first electronic device 112 may be further configured to generate second control information for each vehicle of the registered set of vehicles and communicate the generated second control information to each vehicle of the registered set of vehicles. The second control information may be generated based on the predicted unsafe behavior of the first moving object.

Additionally, or alternatively, the first electronic device 112 may be further configured to generate third control information, including a set of safety-measures for the first moving object and communicate the generated third control information to the first moving object. The third control information may be generated based on a determination that the first moving object is a vehicle registered on the control network.

In accordance with an embodiment, the first electronic device 112 may be configured to receive safety information associated with a subsequent geographical control zone which may lie in the current travel route of the first vehicle 104. Such safety information may correspond to, for example, an event associated with the subsequent geographical control zone. The first electronic device 112 may be further configured to predict a safe route for the first vehicle 104 based on the received safety information and generate fourth control information, including the predicted safe route. The first vehicle 104 may be controlled further based on the generated fourth control information.

Additionally, or alternatively, the first electronic device 112 may be configured to determine one or more safe driving zones for the first vehicle 104 and predict the safe route for the first vehicle 104 based on the determined one or more safe driving zones. The first electronic device 112 may be further configured to generate the fourth control information, including the predicted safe route. The first vehicle 104 may be controlled based on the generated fourth control information, while overriding the current travel route preset on the first vehicle 104.

Figure 2:
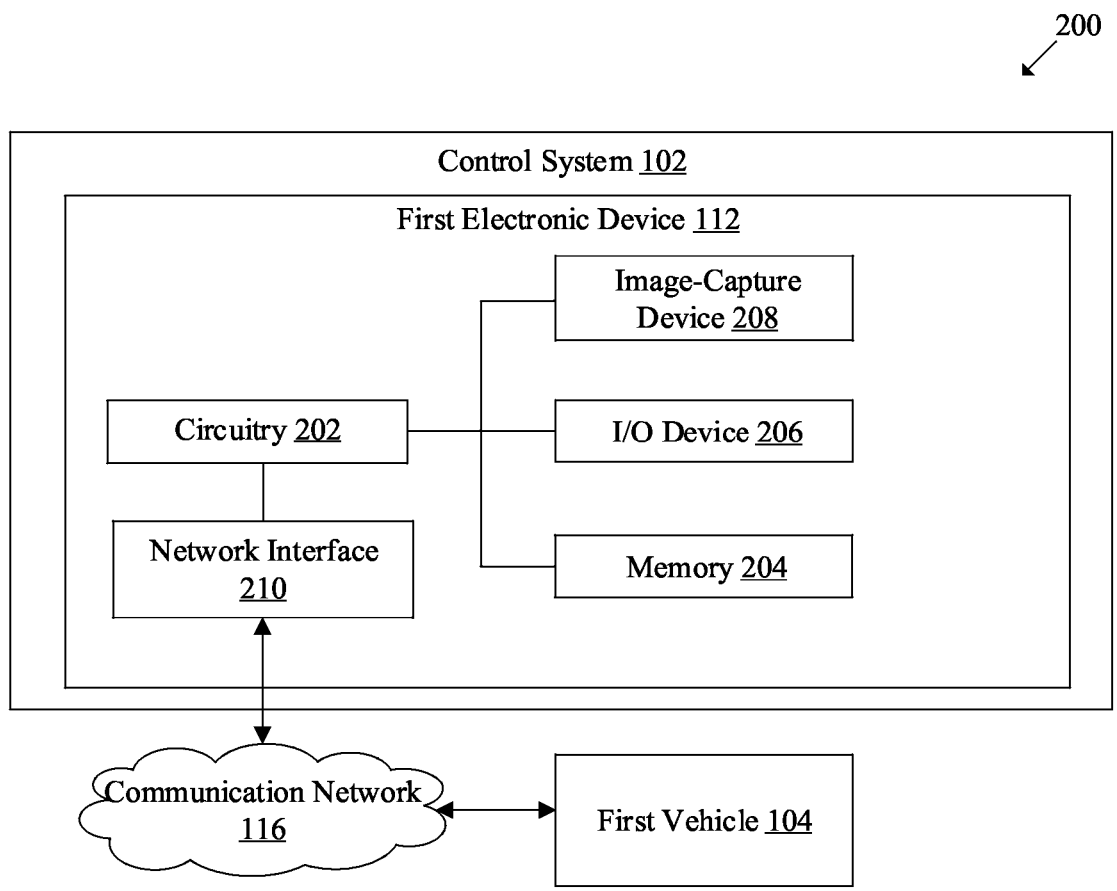
FIG. 2 is a block diagram that illustrates an example control system for vehicle control in geographical control zones, in accordance with an embodiment of the disclosure.

FIG. 2 is a block diagram that illustrates an example control system for vehicle control in geographical control zones, in accordance with an embodiment of the disclosure. FIG. 2 is explained in conjunction with elements from FIG. 1. With reference to FIG. 2, there is shown a block diagram 200 of the control system 108. The control system 108 may include the first electronic device 112 and the set of electronic devices 114. The first electronic device 112 may include circuitry 202 which may execute operations for vehicle control in geographical control zones, such as the geographical control zone 106. The first electronic device 112 may further include a memory 204 and an input/output (I/O) device 206, an image-capture device 208, and a network interface 210. The circuitry 202 may be communicatively coupled to the memory 204, the I/O device 206, the image-capture device 208, and the network interface 210.

The circuitry 202 may comprise suitable logic, circuitry, and interfaces that may be configured to execute instructions stored in the memory 204. The instructions may correspond to operations which may include, but are not limited to, a receipt of traffic information of the group of moving objects 102, generation of a set of images frames of the first moving object based on application of a trained NN model on the received traffic information, prediction of an unsafe behavior of the first moving object based on the generated set of image frames, and generation of first control information including an alternate route for the first vehicle 104 based on the predicted unsafe behavior. The circuitry 202 may be implemented based on a number of processor technologies known in the art. Examples of the circuitry 202 may include, but are not limited to, a Graphical Processing Unit (GPU), a processor, a co-processor, a Central Processing Unit (CPU), x86-based processor, a Reduced Instruction Set Computing (RISC) processor, an Application-Specific Integrated Circuit (ASIC) processor, a Complex Instruction Set Computing (CISC) processor, and a combination thereof.

The memory 204 may comprise suitable logic, circuitry, and interfaces that may be configured to store the instructions to be executed by the circuitry 202. The memory 204 may be also configured to store traffic information, other event related information for the first vehicle 104, and/or the trained NN model. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, and/or interfaces that may be configured to act as an I/O channel/interface between a user and the first electronic device 112 and/or the set of electronic devices 114. The I/O device 206 may be configured to receive inputs and display output based on the received input. The I/O device 206 may include various input and output devices, which may be configured to communicate with different operational components of the first electronic device 112. Examples of the I/O device 206 may include, but are not limited to, a touch screen, a keyboard, a mouse, a joystick, a microphone, and a display screen.

The image-capture device 208 may comprise suitable logic, circuitry, and/or interfaces that may be configured to capture a plurality of image frames of the group of moving objects 102 in a field of view (FOV) region of the image-capture device 208. The image-capture device 208 may be implemented as one of, for example, an active pixel sensor (such as a complementary metal oxide (CMOS) sensor), a passive pixel sensor (such as a charge coupled device (CCD) sensor), an oversampled binary image sensor, a planar Fourier capture array (PFCA), and a back-illuminated (BSI or BI) sensor, and the like.

The network interface 210 may comprise suitable logic, circuitry, and/or interfaces that may be configured to facilitate communication between the control system 108 and the server 110, via the communication network 116. The network interface 210 may be configured to facilitate communication among the first electronic device 112, the set or more electronic devices 114, and other nodes, via the communication network 116. The network interface 210 may be implemented by use of various known technologies to support wired or wireless communication of the control system 108 with the communication network 116. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 210 may be configured to communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the control system 108, as described in FIG. 1, may be executed by the circuitry 202 of the first electronic device 112. The operations executed by the circuitry 202 are described in detail, for example, in the FIGS. 3, 4, 5, 6, 7A, 7B, and 8.

Figure 3:
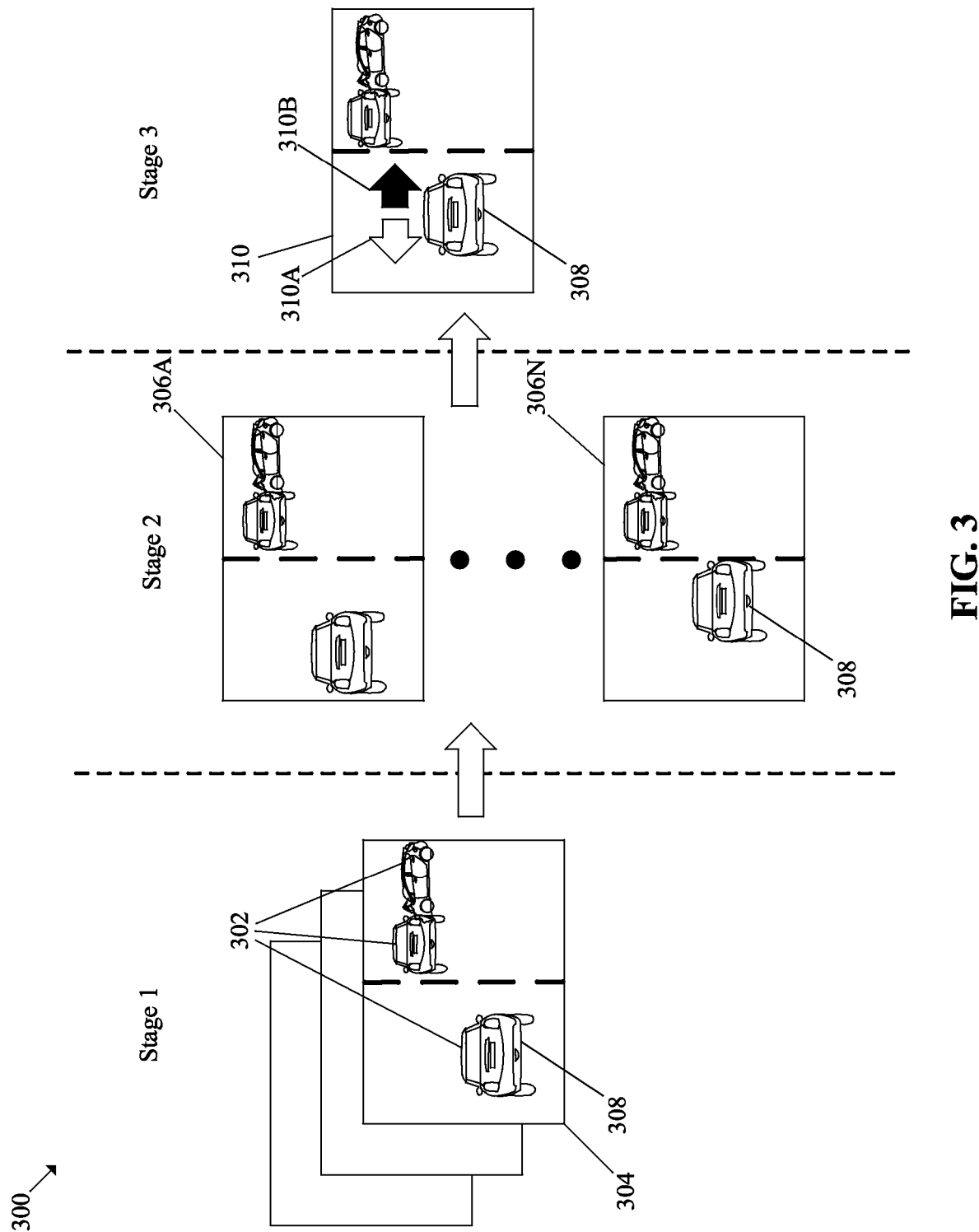
FIG. 3 is a diagram that illustrates exemplary operations for vehicle control in geographical control zones, in accordance with an embodiment of the disclosure.

FIG. 3 illustrates exemplary operations for vehicle control in geographical control zones, in accordance with an embodiment of the disclosure. FIG. 3 is explained in conjunction with elements from FIG. 1 and FIG. 2. With reference to FIG. 3, there is shown a block diagram 300 of exemplary operations for vehicle control in geographical control zones, such as a geographical control zone 106.

At stage 1, the first electronic device 112 may be configured to receive traffic information from one or more electronic devices of the set of electronic devices 114 in the geographical control zone 106. Additionally, or alternatively, the traffic information may be received from a first control zone master (not shown). The first electronic device 112 may be configured to select, from the set of electronic devices 114, a second electronic device as the first control zone master of the geographical control zone 106. Such a selection may be based on one or more factors, such as, but not limited to, a proximity or a distance of the first electronic device 112 from the first vehicle 104, or a communication range with a lowest delay.

By way of example, the first control zone master may be on the same road, lane, or within a radius around the first vehicle 104 and may collect the traffic information of the group of moving objects 302 in the geographical control zone 106. The first control zone master may be configured to receive a retrieval request for the collected traffic information from one or more electronic devices of the set of electronic devices 114 and share the collected traffic information with the one or more electronic devices of the set of electronic devices 114 based on the received retrieval request.

The traffic information may include a plurality of image frames 304 of the group of moving objects 302 in the geographical control zone 106. The plurality of image frames 304 may be captured via the image-capture device 208 or image-capture devices integrated with the set of electronic devices 114. Such image-capture devices may capture the plurality of image frames 304 and transmit the captured plurality of image frames 304 to the first electronic device 112 directly via the communication network 116 or via the control zone master. In some embodiments, one or more electronic devices of the set of electronic devices 114 may also capture GNSS information for a plurality of locations, such as landmarks, intersections, traffic conditions, etc., in the geographical control zone 106. The captured GNSS information may be included in the traffic information and transmitted to the first electronic device 112 either directly or via the control zone master.

At stage 2, the first electronic device 112 may be configured to process the received traffic information, including the captured plurality of image frames 304. The processing of the plurality of image frames 304 may be based on application of an (trained) NN model on the captured plurality of image frames 304 to generate a set of image frames 306A . . . 306N. The generated set of image frames 306A . . . 306N may correspond to a set of likely positions of a first moving object 308 of the group of moving objects 302 at a future time instant.

The NN model may be pre-trained on a training dataset which includes input-output image pairs of moving objects. For example, in an input-output image pair for a moving object, an input image may denote an initial position as an initial state of the moving object, while an output image may denote next position as a next state of the moving object. The NN model may be pre-trained to predict a plurality of discrete distributions for the first moving object 308 of the group of moving objects 302. The NN model may be pre-trained to predict a movement (e.g., vehicle movement) of the first moving object 308 without attempting to reconstruct the first moving object 308 in real pixel information. The trained NN model may individual apply the predicted plurality of discrete distributions to a first image frame of the first moving object 308 from the plurality of image frames 304. The trained NN model may use convolutional mechanism (e.g., with fully connected weights) to compute expected value of motion distribution for each pixel of the first image frame and apply the motion distribution to each pixel of the first image frame so as to generate a first predicted image frame of the set of image frames 306A . . . 306N. As an example, a set of image frames $\hat{J}_t(x, y)$, as predictions, may be generated from a first image frame $\hat{I}_{t-1}(x\text{-}k, y\text{-}l)$ of the plurality of image frames 304, based on an equation (1), given as follows:

$$\hat{J}_t(x, y) = \sum_{K \in (-k,k)} \sum_{l \in (-k,k)} \hat{m}(k, l)\hat{I}_{t-1}(x-k, y-l) \quad (1)$$

where, k may be a spatial size of a normalized predicted convolutional kernel, and $\hat{m}(k, l)$ may be multiple transformations (or motion distributions) which may be applied to the first image frame $\hat{I}_{t-1}(x\text{-}k, y\text{-}l)$ to generate the set of image frames $\hat{J}_t(x, y)$.

In some instances, the generated set of image frames 306A . . . 306N may include a specific number of image frames which may be an optimal outcome of the trained NN model in the given time frame. Additionally, or alternatively, the trained NN may also output a prediction result as an indication of an unsafe behavior of the first moving object 308 in the generated set of image frames 306A . . . 306N. In certain instances, the unsafe behavior of the first moving object 308 may be determined based on motion information of the group of moving objects 302 determined based on the received traffic information. The motion information may include one or more of, for example, a moving direction, a moving speed, a driving pattern, a driving lane, a driving side of a road, and the like.

The predicted unsafe behavior may correspond to a violation of a traffic rule by the first moving object 308. Additionally, or alternatively, the predicted unsafe behavior may correspond to, for example, a sudden flash of lights, an unrecognized behavior of animals, noisy and distracting objects, and the like. In some embodiments, the trained NN model may also utilize GNSS information in the traffic information to predict the unsafe behavior. The GNSS information may be helpful in case of turns and intersections on the road, as an example. For example, the trained NN model may determine that a moving object will take a right turn after "2" seconds and therefore, may not consider the behavior of the first moving object 308 as unsafe at a future time instant.

The trained NN model may output the set of image frames 306A . . . 306N corresponding to a set of likely positions of the first moving object 308 at the future time instant. The trained NN model may output a likelihood score for each image frame of the generated set of image frames 306A . . . 306N. The likelihood score may determine a probability of the first moving object 308 to be in one of the position as determined by the trained NN model at a future time instant. In some embodiments, the trained NN model may output the prediction result as indication of the unsafe behavior of the first moving object 308 based on a comparison among the likelihood score for each image frame of the generated set of image frames 306A . . . 306N.

Some examples of the trained NN model may include, but are not limited to, a Convolutional Neural Network (CNN), a Fast Regional-Adaptive (R) CNN, a Faster RCNN, an Artificial Neural Network (ANN), or a multi-step CNN. In certain instances, the trained NN model may be a hybrid network of a CNN and other Deep NN types, such as a recurrent neural network (RNN), a Long Short Term Memory (LSTM)-based RNN, a Connectionist Temporal Classification (CTC)-based RNN, or a Generative Adversarial Network (GAN).

In some embodiments, the trained NN model may be implemented on a specialized neural network circuitry of the first electronic device 112. In some other embodiments, the trained NN model may be stored as program code, neural schema, and/or an Artificial Intelligence (AI)-based application on the first electronic device 112 or on the server 110. Additionally, or alternatively, the trained NN may be implemented as a combination of the program code and the specialized neural network circuitry.

The first electronic device 112 may be configured to predict the unsafe behavior of the first moving object 308 based on the generated set of image frames 306A . . . 306N. As an example, the unsafe behavior may be predicted based on the prediction result of the trained NN model. Additionally, in certain instances, the first electronic device 112 may utilize the motion information, as described above, to determine the unsafe behavior of the first moving object 308. In some embodiments, the first electronic device 112 may be further configured to determine a likelihood of collision of the first vehicle 104 with the first moving object 308 based on the generated set of image frames 306A . . . 306N and predict the unsafe behavior of the first moving object 308 based on the determined likelihood of collision.

At stage 3, a final image frame 310 corresponding to a likely position of the first moving object 308 may be selected from the generated set of image frames 306A . . . 306N. The final image frame 310 may be selected as an image frame which has the highest likelihood score among the generated set of image frames 306A . . . 306N. The final image frame 310 may include, for example, a directional arrow 310A and a directional arrow 310B to indicate a safe behavior and an unsafe behavior, respectively, of the first moving object 308 at the future time instant. For example, in the final image frame 310, two vehicles may be on course of a collision. The directional arrow 310A may indicate that the first moving object 308 may remain safe if the first moving object 308 changes its moving direction to the left side and the directional arrow 310B may indicate that the first moving object 308 may remain unsafe if the first moving object 308 changes its moving direction to the right side. The directional arrow 310A and directional arrow 310B may also be used to provide recommendation to select a moving direction for the first vehicle 104.

The first electronic device 112 may be further configured to generate a first control information for the first vehicle 104. The first control information may include an alternative route for the first vehicle 104 in the geographical control zone 106. Additionally, or alternatively, the first control information may include information regarding the alternate route. Such information may include, for example, traffic conditions on the alternate route and Estimated-Time-of-Arrival (ETA) to the destination via the alternate route. Additionally, or alternatively, the first control information may further include control signals for braking controls, steering controls, acceleration controls, clutch controls, and/or gear controls for the first vehicle 104.

In some embodiments, the first electronic device 112 may be configured to predict a first travel route of the first moving object 308 based on the predicted unsafe behavior of the first moving object 308 and determine a current travel route of the first vehicle 104. The first electronic device 112 may be further configured to determine the likelihood of collision of the first vehicle 104 with the first moving object 308 based on the predicted first travel route and determined current travel route. In such instances, the first control information (including an alternate route for the first vehicle 104) may be generated based on the determined likelihood of collision of the first vehicle 104 with the first moving object 308.

The first vehicle 104 may be controlled based on the first control information. Alternatively, the first electronic device 112 may be configured to control the first vehicle 104 based on the generated first control information. The current travel route of the first vehicle 104 may be changed in accordance with the alternate route, as specified in the first control information. The alternate route may be a safe route for the first vehicle 104 and by moving along the alternate route, the first vehicle 104 may take a preemptive maneuver to avoid a collision with the first moving object 308.

In certain scenarios, it may be determined that the collision of the first vehicle 104 with the first moving object 308 is unavoidable based on a current speed of either one of or both of the first vehicle 104 and the first moving object 308. In certain other scenarios, it may be determined that there is not enough time for the first vehicle 104 to change the current travel route to the alternate route and that the likelihood of the collision of the first vehicle 104 with the first moving object 308 is greater than a threshold value. Additionally, or alternatively, an impact of the collision of the first vehicle 104 with the first moving object 308 may be predicted by the first electronic device 112. In such scenarios, as a preemptive maneuver, the first electronic device 112 may be configured to control a safety hardware of the first vehicle 104 so as to mitigate effect of the impact on the first vehicle 104. For example, if the predicted impact is low, then the first electronic device 112 may be configured to control inflation of air bags in the first vehicle 104 before the collision. Alternatively, if the predicted impact is high (for example, a rollover situation), then the first electronic device 112 may be configured to control the first vehicle 104 to execute a preemptive counter rollover maneuver to ensure that the first vehicle doesn't rolls upon, before, or after impact with the first moving object 308. For example, such preemptive counter rollover maneuver may include control of axle damping positions in the first vehicle 104 to balance a center of gravity so that rollover of the first vehicle 104 is avoided.

In some scenarios, the traffic information may include a plurality of image frames of a flying debris (e.g., a sheet metal) due to a tornado in the geographical control zone 106. The first electronic device 112 may be configured to process the plurality of image frames and predict an unsafe behavior of the flying debris. The first electronic device 112 may be further configured to generate the first control information, including the alternate route for the first vehicle 104 based on the predicted unsafe behavior of the flying debris. The first vehicle 104 may be controlled to change the current travel route to the alternate route based on the first control information. The alternate route may be a safe route where a likelihood of the collision of the flying debris with the first vehicle 104 is below a threshold value, e.g., very low (<0.01) or nearly zero.

Figure 4:
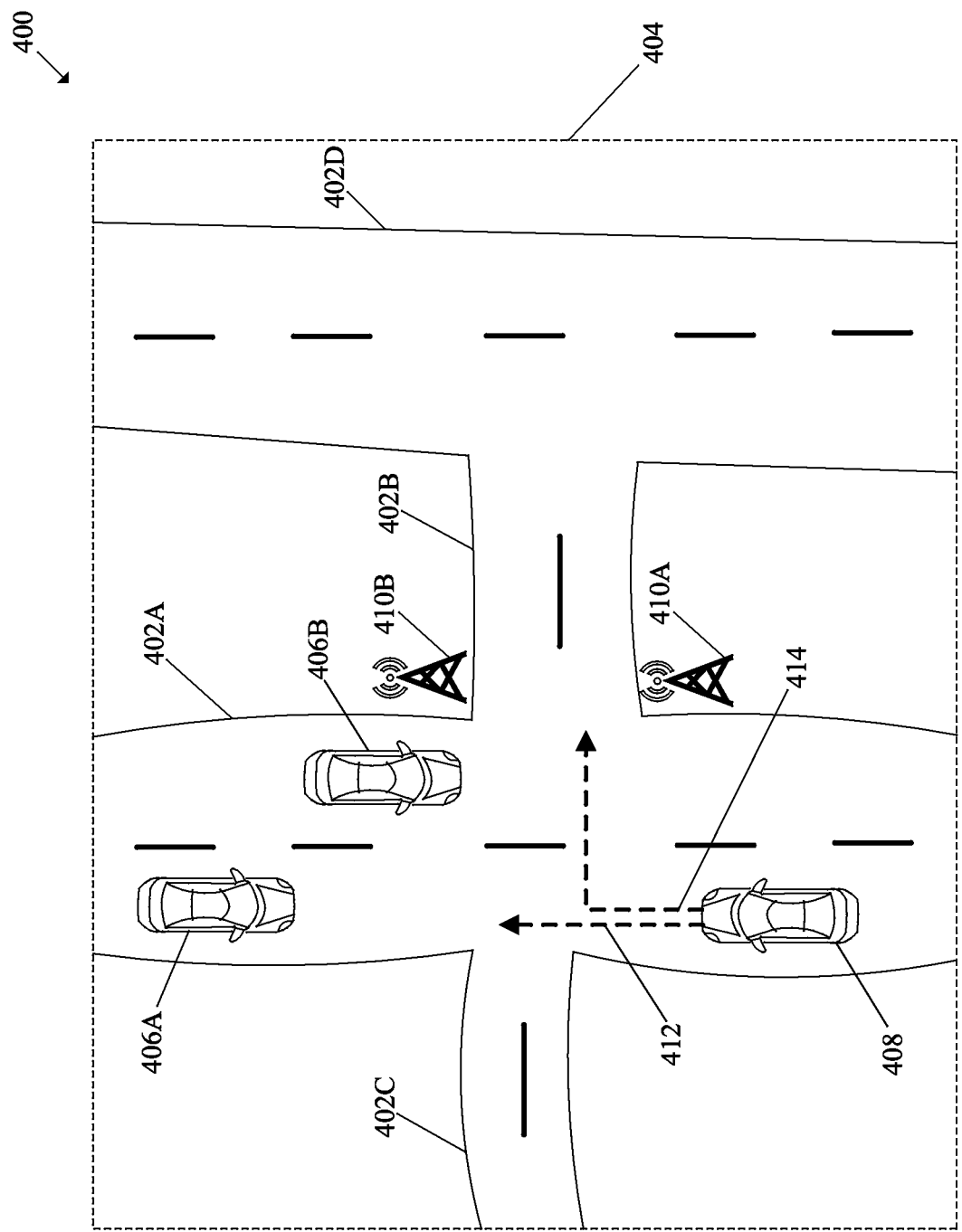
FIG. 4 is a diagram that illustrates an exemplary scenario for vehicle control in geographical control zones, in accordance with an embodiment of the disclosure.

FIG. 4 is a diagram that illustrates an exemplary scenario for vehicle control in geographical control zones, in accordance with an embodiment of the disclosure. FIG. 4 is explained in conjunction with elements from FIG. 1, FIG. 2, and FIG. 3. With reference to FIG. 4, there is shown a block diagram 400 of an exemplary scenario for vehicle control in geographical control zones. In FIG. 4, there is shown a plurality of routes 402A, 402B, 402C, and 402D in a geographical control zone 404. There is further shown a group of moving objects 406A and 406B and a first vehicle 408. The geographical control zone 404 may also include a plurality of control zone masters, such as a first control zone master 410A and a second control zone master 410B. The first control zone master 410A and the second control zone master 410B may be, for example, V2I devices installed near intersection points on a route 402A and may be a part of the control system 108.

Initially, the first vehicle 408 may be configured to follow a current travel route 412 which may lead to a destination point where the first vehicle 408 intends to reach. At a certain time-instant, the first vehicle 408 may come within a first communication range of the first control zone master 410A which may be a part of the control system 108. The first communication range of the first control zone master 410A may correspond to the range up to which the first control zone master 410A may assist the first vehicle 408.

The first control zone master 410A may be configured to detect the first vehicle 408 in the first communication range by use of an image-capture device associated with the first control zone master 410A. Additionally, or alternatively, the first vehicle 408 may be detected by use of radar sensors (not shown) or road-side beacons (not shown) or LiDAR (not shown). The first control zone master 410A may be further configured to transmit a query to the detected first vehicle 408 for setting up a geographical control zone 404 which spans up to a defined distance, via the communication network 116. The first vehicle 408 may be configured to receive the query and respond back to the query with an input corresponding to an acceptance to set up the geographical control zone 404 up to the defined distance. The first control zone master 410A may be further configured to establish the geographical control zone 404 around the first vehicle 408 and inform the second control zone master 410B about the establishment of the geographical control zone 404 around the first vehicle 408. Such established geographical control zone 404 may also include other control zone masters, including but not limited to, the second control zone master 410B.

The first control zone master 410A may be configured to collect traffic information of the group of moving objects 406A and 406B from one or more electronic devices in the first communication range of the first control zone master 410A. Thereafter, the first control zone master 410A may be configured to share the collected traffic information with the other electronic devices, including but not limited to, the second control zone master 410B. Similarly, the second control zone master 410B may be configured to collect the traffic information from one or more electronic devices in a second communication range of the second control zone master 410B. The second control zone master 410B may be further configured to share the collected traffic information with the other electronic devices, including but not limited to, the first control zone master 410A. The group of moving objects 406A and 406B may include a registered vehicles and/or non-registered vehicles. The registered vehicles may include vehicles which may use services, such as driving assistance, provided by the control system 108. Whereas the non-registered vehicles may include vehicles which may not use services provided by the control system 108.

In some embodiments, the first control zone master 410A may be configured to receive the traffic information from the second control zone master 410B. The first control zone master 410A may be further configured to determine that a first moving object 406A of the group of moving objects 406A and 406B belongs to a set of non-registered vehicles. The first control zone master 410A may be further configured to process the received traffic information and predict the unsafe behavior of the first moving object 406A. The processing of traffic information may include an application of the trained NN model on the received traffic information. The unsafe behavior of the first moving object 406A may correspond to, for example, a violation of a traffic rule, which may vary from one geographical area to other.

The first control zone master 410A may be further configured to generate first control information, including an alternate route 414 for the first vehicle 408. The first control information may be transmitted to the first vehicle 408. The first vehicle 408 may process the first control information and change its route form the current travel route 412 to the alternate route 414 based on the first control information. In some instances, the first control zone master 410A may be configured to control the first vehicle 408 to change its route from the current travel route 412 to the alternate route 414 based on the first control information. In some other instances, the current travel route 412 of the first vehicle 408 may be remain unchanged if the first control zone master 410A determines that the probability of collision between the first vehicle 408 and the first moving object 406A is very low.

In certain embodiments, the first control zone master 410A may be configured to register a set of vehicles, including but not limited to, the first vehicle 408 on a control network. The registered set of vehicles may be in the geographical control zone 404. The first control zone master 410A may be further configured to generate second control information for each vehicle of the registered set of vehicles and communicate the generated second control information to each vehicle of the registered set of vehicles. The second control information may be generated based on the predicted unsafe behavior of the first moving object 406A. The second control information may include, for example, an alternate path for each of the registered set of vehicles which may have a likelihood of collision with the first moving object 406A. The second control information may be directly communicated to each vehicle of the registered set of vehicles by the first control zone master 410A, via the communication network 116. Alternatively, the first control zone master 410A may be configured to share the second control information with each electronic device of a set of electronic devices in the geographical control zone 404. Each of the set of electronic devices may be further configured to share the second control information with respective vehicles in their respective communication ranges.

In certain embodiments, the first control zone master 410A may be further configured to generate third control information based on a determination that the first moving object is a vehicle registered on the control network. The third control information may include a set of safety-measures for the first moving object 406A. The set of safety-measures may include, for example, alert messages, brake controls, changes in lane, steering controls, and the like. The first control zone master 410A may be configured to communicate the third control information to the first moving object 406A. Additionally, in certain instances, the first control zone master 410A may be further configured to control the first moving object 406A based on the third control information.

It should be noted that above operations of the first control zone master 410A may be performed by the second control zone master 410B or any other electronic device of a set of electronic devices which may be a part of the geographical control zone 404. As an example, the first control zone master 410A may correspond to the first electronic device 112 of FIG. 1.

In certain scenarios, there may be only one control zone master in the geographical control zone 404. Additionally, or alternatively, there may be one control zone master and multiple control zone slaves in the geographical control zone 404. The control zone slaves may only collect the traffic information and pass it to the control zone master which may predict the unsafe behavior of the first moving object 406A.

In certain other scenarios, the control zone masters may be a set of vehicles moving on a route (for example, the route 402A). Each of the set of vehicles may collect the traffic information in the FOV region of vehicle camera(s) and share the traffic information with each other in the communication range. Each of the set of vehicles may predict an unsafe behavior of a second vehicle in the communication range and inform other vehicles about the predicted unsafe behavior of the second vehicle.

In certain other scenarios, a first vehicle of the set of vehicles moving on a route may predict the unsafe behavior of a second vehicle (i.e. a first moving object) while the second vehicle is in a FOV of vehicle cameras installed on the first vehicle. In some instances, the second vehicle may not be in the field-of-view (FOV) of the vehicle cameras of the first vehicle. The first vehicle may be configured to predict the unsafe behavior of the second vehicle based on the traffic information from other vehicles of the set of vehicles in the geographical control zone 404. In certain other scenarios, the first vehicle may be configured to predict the unsafe behavior of the second vehicle based on the traffic information collected by a vehicle, an in-vehicle ECU, an in-vehicle camera, an external vehicle camera, a RSU, a V2I communication device, a camera drone, or a combination thereof.

Figure 5:
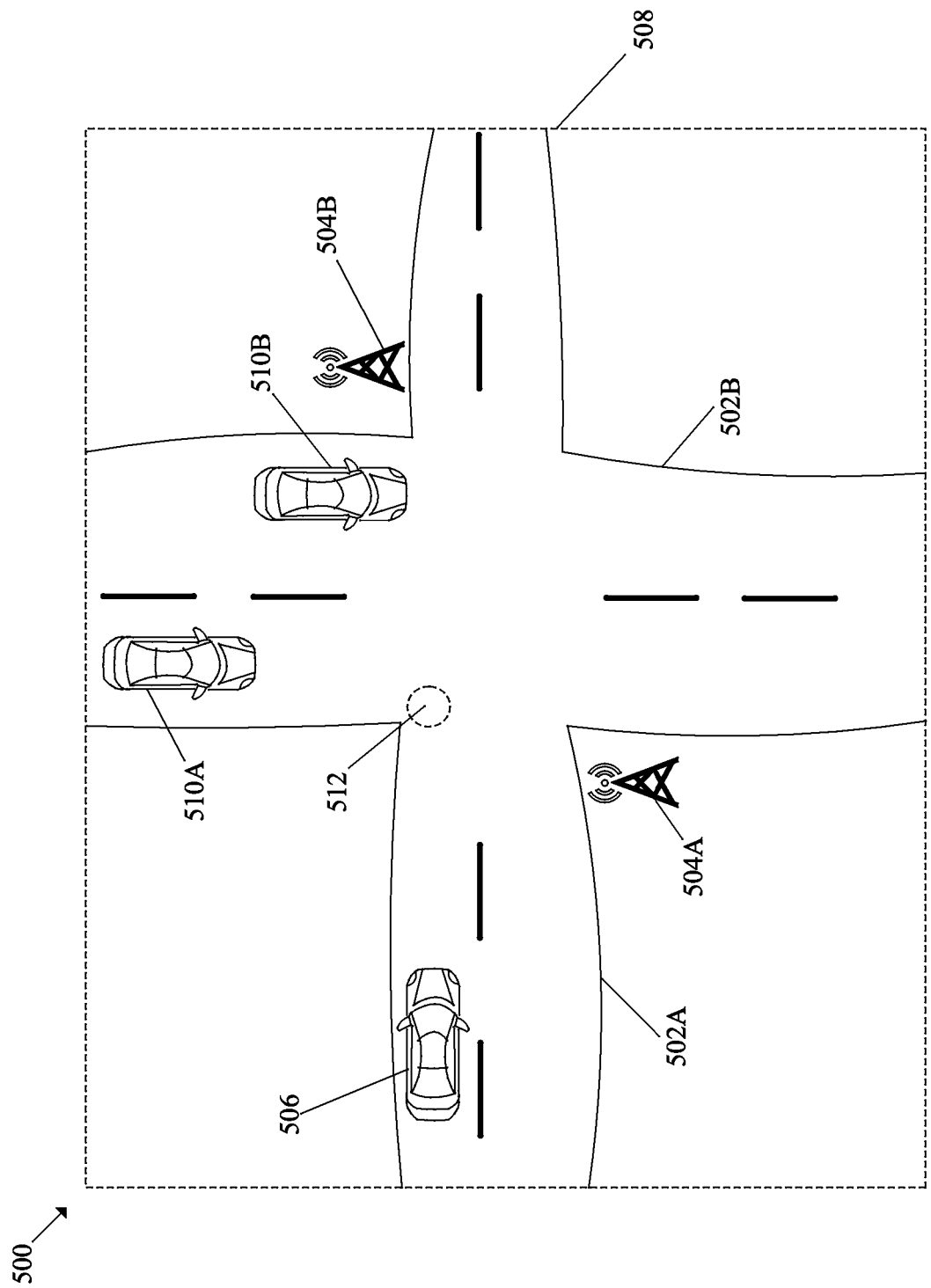
FIG. 5 is a diagram that illustrates an exemplary scenario for vehicle control in geographical control zones, in accordance with an embodiment of the disclosure.

FIG. 5 is a diagram that illustrates an exemplary scenario for vehicle control in geographical control zones, in accordance with an embodiment of the disclosure. FIG. 5 is explained in conjunction with elements from FIG. 1, FIG. 2, FIG. 3, and FIG. 4. With reference to FIG. 5, there is shown a block diagram 500 of an exemplary scenario for vehicle control in geographical control zones.

In FIG. 5, there is shown a plurality of routes, such as a first route 502A and a second route 502B. There is further shown a first control zone master 504A and a second control zone master 504B. The first control zone master 504A or the second control zone master 504B may provide driving assistance to the registered set of vehicles (which includes a first vehicle 506) in the geographical control zone 508. There is further shown a group of moving objects 510A and 5108 and the first vehicle 506. In some embodiments, both the first control zone master 504A and the second control zone master 504B may provide driving assistance to the first vehicle 506 time to time based on a proximity of one of the first control zone master 504A or the second control zone master 504B to the first vehicle 506.

At certain time instant, the first vehicle 506 may be detected by the first control zone master 504A. The first control zone master 504A may be configured to establish the geographical control zone 508 around the detected first vehicle 506 based on an input from the first vehicle 506. The first control zone master 504A may be configured to collect the traffic information from one or more electronic devices of a set of electronic devices in the communication range of the first control zone master 504A. The collected traffic information may include a plurality of image frames of the group of moving objects 510A and 510B on the first route 502A (same as that for the first vehicle 506). The traffic information may be sufficient for prediction of an alternate route (if unsafe behavior of any moving object is predicted) up to an intersection point 512. Additionally, in certain instances, the first control zone master 504A may be configured to request for the traffic information from the second control zone master 504B. The second control zone master 504B may collect and transmit the traffic information to the first control zone master 504A. The traffic information received from the second control zone master 504B may correspond to the second route 502B.

The first control zone master 504A may be configured to process the traffic information to predict the unsafe behavior of a first moving object 510A of the group of moving objects 510A and 510B. For example, the unsafe behavior of the first moving object 510A may related to a likelihood of a collision with the first vehicle 506 when the first vehicle 506 reaches the intersection point 512. The processing of the traffic information may correspond to application of the trained NN model on the traffic information. The first control zone master 504A may then generate first control information which may include an alternate route for the first vehicle 506.

In some embodiments, the second control zone master 504B may be a part of a subsequent geographical control zone which lies in the current travel route of the first vehicle 506. The second control zone master 504B may collect safety information corresponding to the second route 502B from a set of electronic devices in the communication range of the second control zone master 504B. The second control zone master 504B may determine events registered or likely to occur in the subsequent geographical control zone based on the safety information. Such events may correspond to, but not limited to, an accident, a terrorist attack, a wrecked route, a bad weather condition like a tornado or a heavy rainfall, and the like. The second control zone master 504B may transmit the safety information and/or the determined events associated with the subsequent geographical control zone to the first control zone master 504A.

The first control zone master 504A may be configured to receive and process the safety information and predict a safe route for the first vehicle 506 based on the processed safety information. The safe route may be a preemptive measure to avoid an encounter of the first vehicle 506 with such events and to ensure that the first vehicle 506 remains safe in course of the journey. The first control zone master 504A may be configured to generate fourth control information which may include the predicted safe route for the first vehicle 506. The first vehicle 506 may be further controlled based on the generated fourth control information. In some embodiments, the first control zone master 504A may be further configured to share the safety information with all the vehicles in the corresponding control zone via the communication network 116.

In some embodiments, based on the received safety information, it may be determined that the first vehicle 506 may not remain safe in case the first vehicle 506 enters the subsequent geographical zone, for example, a traffic collision. In such cases, the first control zone master 504A may be configured to determine one or more safe driving zones (not shown) for the first vehicle 506. Such safe driving zones may lead the first vehicle 506 to the intended destination point. The first control zone master 504A may be further configured to predict the safe route for the first vehicle 506 based on the determined one or more safe driving zones. The first control zone master 504A may be further configured to generate the fourth control information that includes the predicted safe route for the first vehicle 506. The first vehicle 506 may be controlled based on the generated fourth control information. For example, the first vehicle 506 may be controlled by overriding the current travel route preset on the first vehicle 506 with the predicted safe route.

In some embodiments, the first control zone master 504A and the second control zone master 504B may be vehicles present in the geographical control zone 508. The vehicles may be moving vehicles and therefore, may exit a geographical control zone after some time period. In such a scenario, control zone masters may be selected from a set of electronic devices in a newly established geographical control zone 508 around the first vehicle 506. In some other embodiments, a priority value may be associated with each of the electronic device of the set of electronic devices. In such a scenario, the priority value of each electronic device present currently in newly established geographical control zone may be compared and control zone master(s) may be selected based on the comparison of the priority value.

Figure 6:
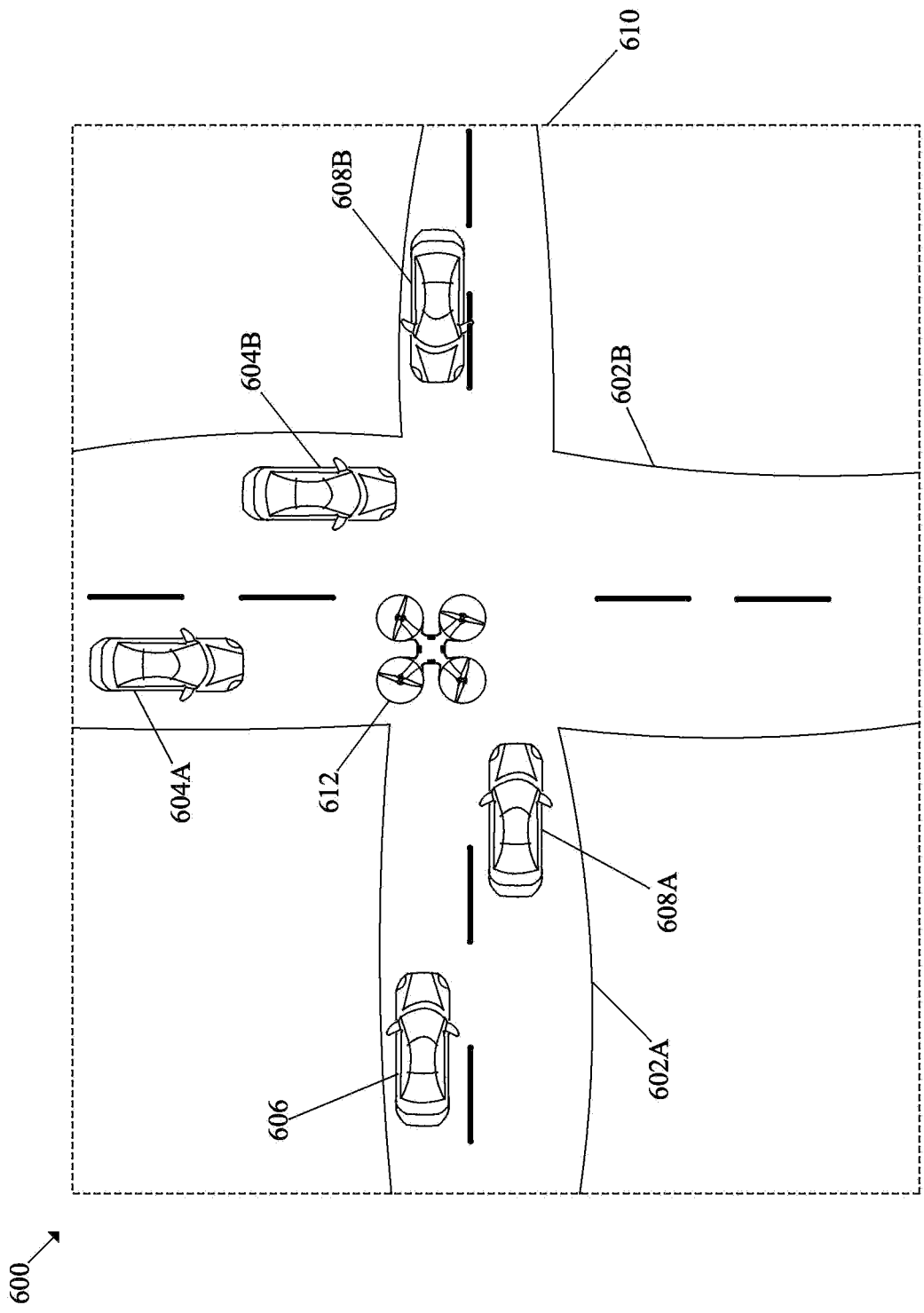
FIG. 6 is a diagram that illustrates an exemplary scenario for vehicle control in geographical control zones, in accordance with an embodiment of the disclosure.

FIG. 6 is a diagram that illustrates an exemplary scenario for vehicle control in geographical control zones, in accordance with an embodiment of the disclosure. FIG. 6 is explained in conjunction with elements from FIG. 1, FIG. 2, FIG. 3, FIG. 4, and FIG. 5. With reference to FIG. 6, there is shown a block diagram 600 of an exemplary scenario for vehicle control in geographical control zones.

In FIG. 6, there is shown a plurality of routes 602A and 602B. There is further shown a group of moving objects 604A and 604B and a first vehicle 606. There is further shown a first control zone master 608A and a second control zone master 608B. The first control zone master 608A may provide driving assistance to the registered vehicles (such as the first vehicle 606) in a geographical control zone 610. There is further shown a drone 612 which may be initially docked at a docking position (not shown) on the first vehicle 606.

At a certain time-instant, the first vehicle 606 may enter a communication range of the first control zone master 608A. The first control zone master 608A may be configured to detect the first vehicle 606 and establish the geographical control zone 610 around the detected first vehicle 606 based on an input from the first vehicle 606.

In certain scenarios, a first moving object 604A of the group of moving objects 604A and 604B may be absent from the FOV of the first vehicle 606. Additionally, or alternatively, a user associated with the first vehicle 606 may experience a discomfort. Such discomfort may be due to, for example, stress induced by a driving pattern of other vehicles, medical emergency, news of any event on the road, and the like. The first control zone master 608A may be configured to detect a user discomfort level for the first vehicle 606 based on certain parameters, for example, user bio-signals, user movements, or data collected from various other sensors in the first vehicle 606. The first control zone master 608A may be further configured to dispatch the drone 612 to a location of the first moving object 604A on a second route 604B. The drone 612 may be dispatch based on a determination that the first moving object 604A is absent from the FOV of the first vehicle 606. Additionally, or alternatively, the drone 612 may be dispatched based on the detection of the user discomfort level.

The drone 612 may be configured to capture the traffic information of the first moving object 604A and transmit the captured traffic information to the first control zone master 608A. The first control zone master 608A receive the captured traffic information from the drone 612 and generate dynamic motion-based point cloud data for a landing path of the drone 612. The captured traffic information may be used for prediction of the unsafe behavior of the first moving object 604A and to further control the first vehicle 606 along an alternate route so as to avoid a collision with the first moving object 604A.

In certain scenarios, the image-capture device 208 of the first vehicle 606 may witness a malfunction. In such scenarios, the first vehicle 606 may be configured to undock and dispatch the drone 612 to capture the traffic information of the first moving object 604A, which may be either present or absent from the FOV of the first vehicle 606.

In certain other scenarios, the drone 612 may capture and transmit the traffic information to the first vehicle 606 or the first control zone master 608A until the safe route for the first vehicle 606 is predicted by the first control zone master 608A. After the safe route is predicted, the drone 612 may land back at the docking position on the first vehicle 606. In certain other scenarios, the drone 612 may capture the traffic information for a limited time frame and then dock back at the docking position on the first vehicle 606.

Figure 7A:
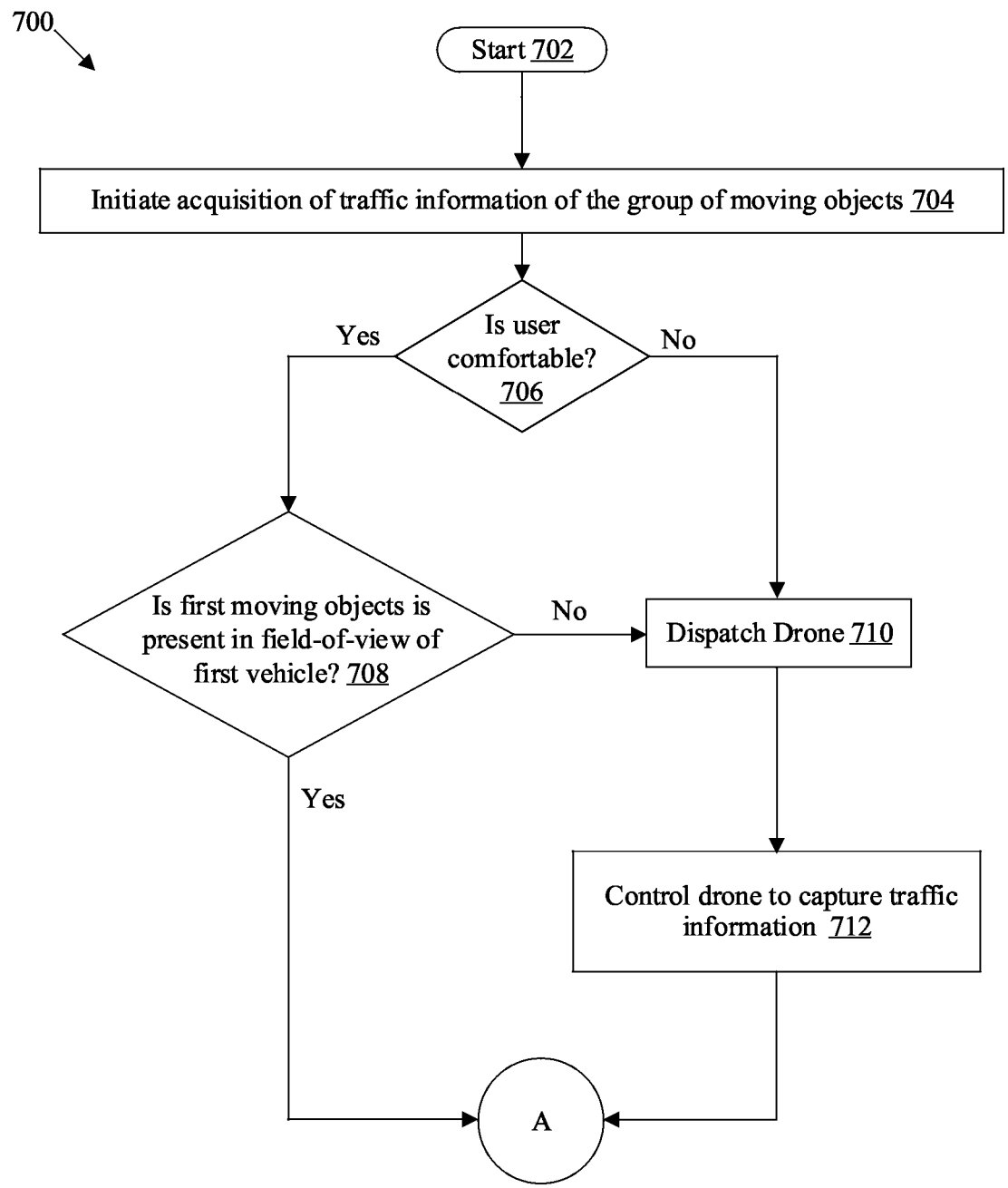
FIGS. 7A and 7B is a flowchart that illustrates exemplary operations for vehicle control in geographical control zones, in accordance with an embodiment of the disclosure.
Figure 7B:
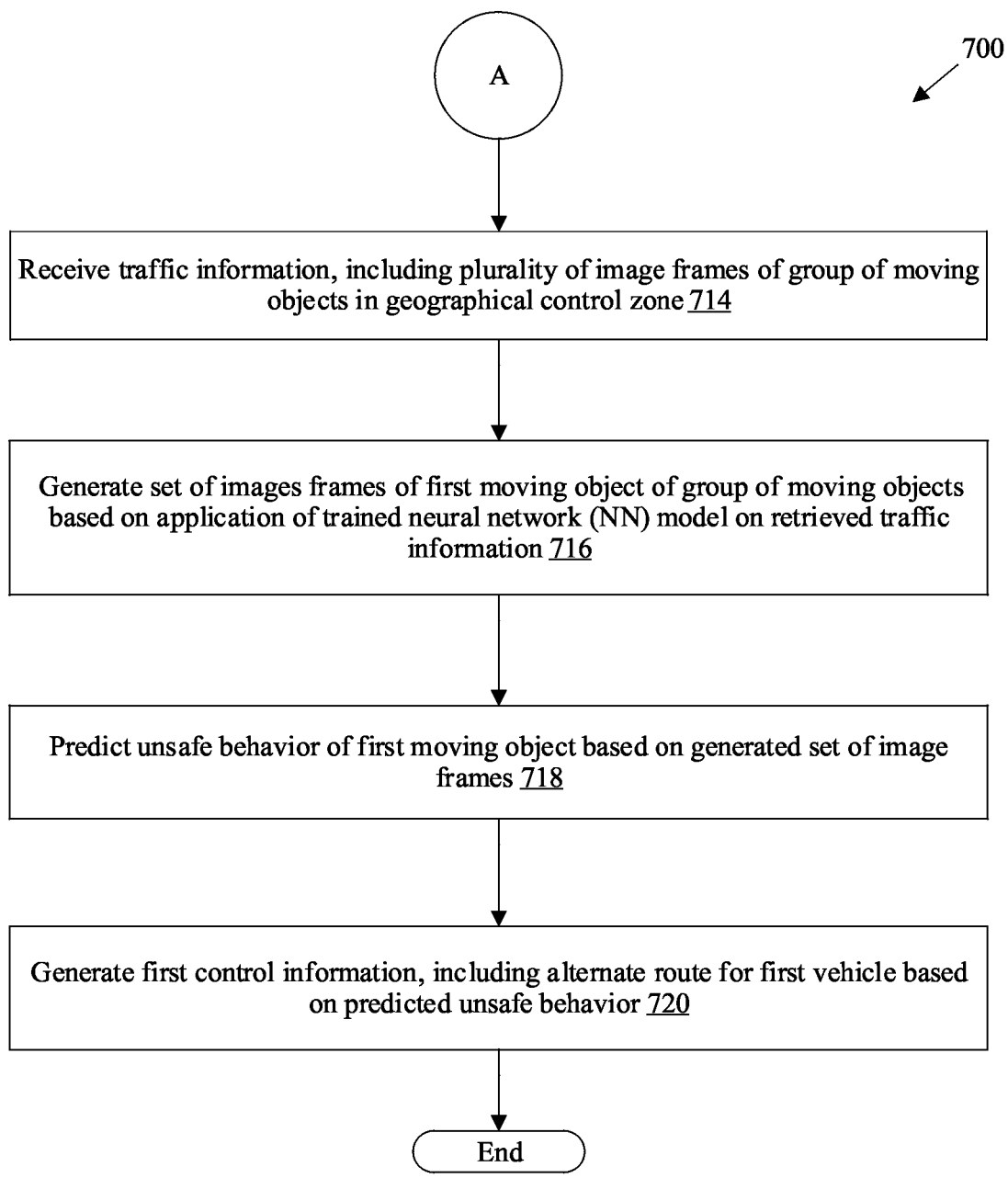

FIGS. 7A and 7B is a flowchart that illustrates exemplary operations for vehicle control in geographical control zones, in accordance with an embodiment of the disclosure. FIGS. 7A and 7B are explained in conjunction with elements from FIGS. 1, 2, 3, 4, 5, and 6. With reference to FIGS. 7A and 7B, there is shown a flowchart 700. The operations from 702 to 720 may be implemented on a system, for example, the control system 108 of FIG. 2. The operations may start at 702 and proceed to 704.

At 704, an operation to acquire traffic information of the group of moving objects 102 may be initiated. In accordance with an embodiment, the first electronic device 112 may be configured to initiate the operation to acquire the traffic information of the group of moving objects 102. Such information may include, for example, a plurality of image frames of the group of moving objects 102, GNSS information or positioning information of the group of moving objects 102, their speed, acceleration, object type, or other information.

At 706, it may be determined whether the user of the first vehicle 104 is comfortable. In accordance with an embodiment, the first electronic device 112 may be configured to determine whether the user of the first vehicle 104 is comfortable. In cases where the user is comfortable, control may pass to 708. Otherwise, the control may pass to 710.

At 708, it may be determined whether a first moving object of the group of moving objects 102 is present in the FOV of the first vehicle 104. In accordance with an embodiment, the first electronic device 112 may be configured to determine whether the first moving object is present in the FOV of the first vehicle 104. In cases where first moving object is present in the FOV, the control may proceed to 714. Otherwise, the control may proceed to 710.

At 710, the drone 612 may be dispatched. In accordance with an embodiment, the first electronic device 112 may be configured to dispatch the drone 612.

At 712, the drone 612 may be controlled to capture the traffic information. In accordance with an embodiment, the first electronic device 112 may control the drone 612 to capture the traffic information.

At 714, the traffic information, including the plurality of image frames of the group of moving objects 102 in the geographical control zone 106 may be received. In accordance with an embodiment, the first electronic device 112 may be configured to receive the traffic information, including but not limited to, the plurality of image frames of the group of moving objects 102 in the geographical control zone 106. The traffic information may be received from one or more electronic devices of the set of electronic devices 114.

At 716, a set of images frames of a first moving object of the group of moving objects 102 may be generated based on application of a trained NN model on the received traffic information. In accordance with an embodiment, the first electronic device 112 may be configured to generate the set of images frames of the first moving object based on the application of the trained NN model on the received traffic information.

At 718, an unsafe behavior of the first moving object may be predicted based on the generated set of image frames. In accordance with an embodiment, the first electronic device 112 may be configured to predict the unsafe behavior of the first moving object based on the generated set of image frames.

At 720, first control information including an alternate route for the first vehicle 104 may be generated based on the predicted unsafe behavior. In accordance with an embodiment, the first electronic device 112 may be configured to generate the first control information including the alternate route for the first vehicle 104 based on the predicted unsafe behavior. Control may pass to an end.

Figure 8:
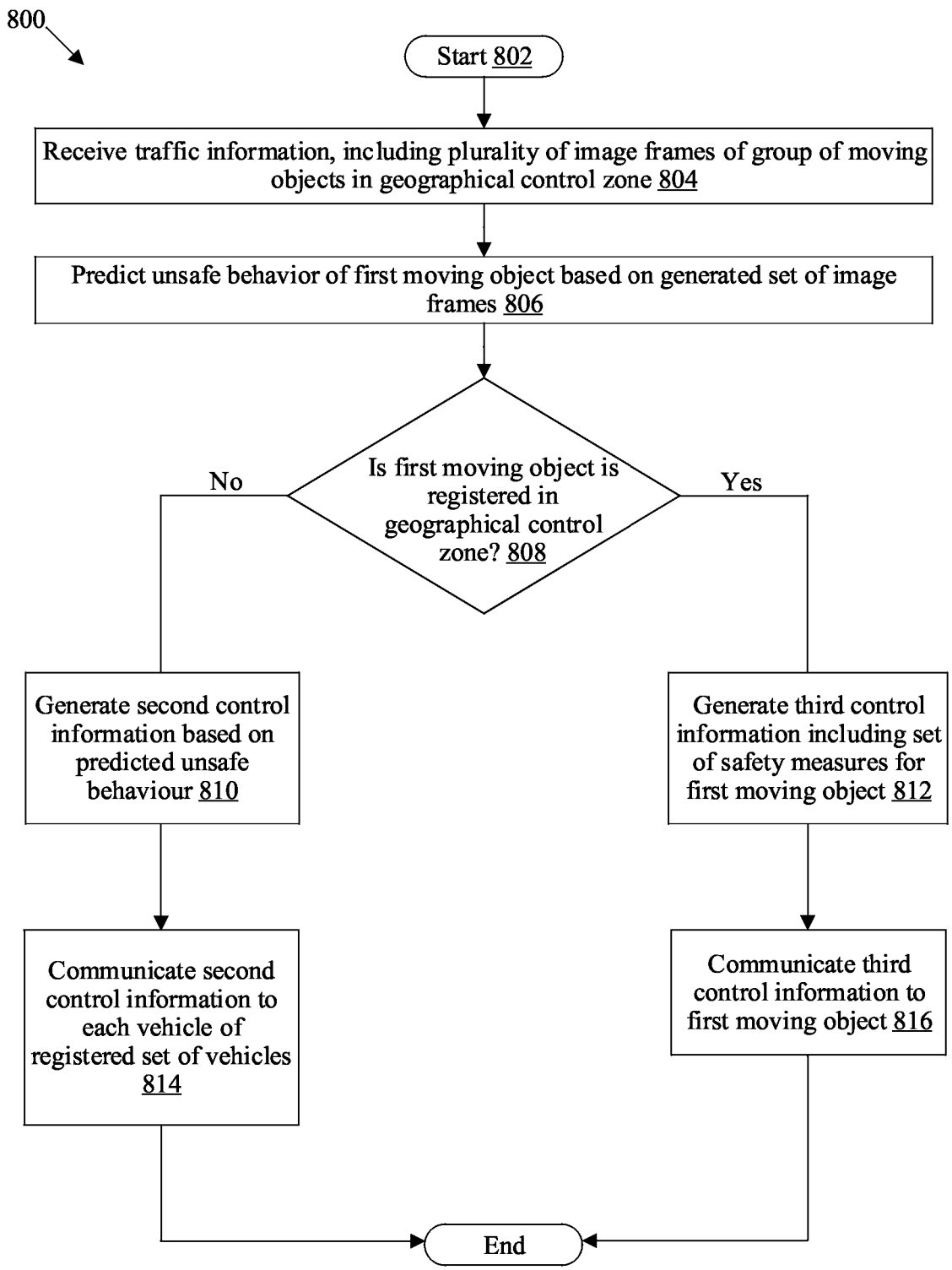
FIG. 8 is a flowchart that illustrates exemplary operations for generation of control information for vehicles in a geographical control zone, in accordance with an embodiment of the disclosure.

FIG. 8 is a flowchart that illustrates exemplary operations for generation of control information for vehicles in a geographical control zone, in accordance with an embodiment of the disclosure. FIG. 8 is explained in conjunction with elements from FIGS. 1, 2, 3, 4, 5, 6, 7A, and 7B. With reference to FIG. 8, there is shown a flowchart 800. The operations from 802 to 816 may be implemented by a system, for example, the control system 108 of FIG. 2. The operations may start at 802 and proceed to 804.

At 804, the traffic information, including the plurality of image frames of the group of moving objects 102 in the geographical control zone 106 may be received. In accordance with an embodiment, the first electronic device 112 may be configured to receive the traffic information, including but not limited to, the plurality of image frames of the group of moving objects 102 in the geographical control zone 106. The traffic information may be received from one or more electronic devices of the set of electronic devices 114.

At 806, an unsafe behavior of the first moving object may be predicted based on the generated set of image frames. In accordance with an embodiment, the first electronic device 112 may be configured to predict the unsafe behavior of the first moving object based on the generated set of image frames. Details of operations to predict the unsafe behavior are provided, for example, in FIGS. 3, 4, 5, and 6.

At 808, it may be determined whether the first moving object is registered in the geographical control zone 106. In accordance with an embodiment, the first electronic device 112 may be configured to determine whether the first moving object is registered in the geographical control zone 106. In cases where the first moving object is registered, control may pass to 810. Otherwise, control may pass to 812.

At 810, second control information may be generated for each vehicle of the registered set of vehicles. In accordance with an embodiment, the first electronic device 112 may be configured to generate second control information for each vehicle of the registered set of vehicles. The second control information may be generated based on the predicted unsafe behavior of the first moving object and may include, for example, an alternate path for each of the registered set of vehicles which may have a likelihood of collision with the first moving object.

At 812, third control information, including a set of safety measures for the first moving object may be generated. In accordance with an embodiment, the first electronic device 112 may be configured to generate third control information for the first moving object if the first moving object is registered in the geographical control zone 106. The set of safety-measures may include, for example, alert messages, brake controls, changes in lane, steering controls, and the like.

At 814, the second control information may be communicated to each vehicle of the registered set of vehicles. In accordance with an embodiment, the first electronic device 112 may be configured to communicate the second control information to each vehicle registered in the geographical control zone. Each vehicle of the registered set of vehicles may be change their current travel route to their corresponding alternate route based on the communicated second control information.

At 816, the third control information may be communicated to the first moving object. In accordance with an embodiment, the first electronic device 112 may be configured to communicate the third control information to the first moving object. The first moving object may be controlled based on the communicated third control information. Control may pass to end.

Figure 9:
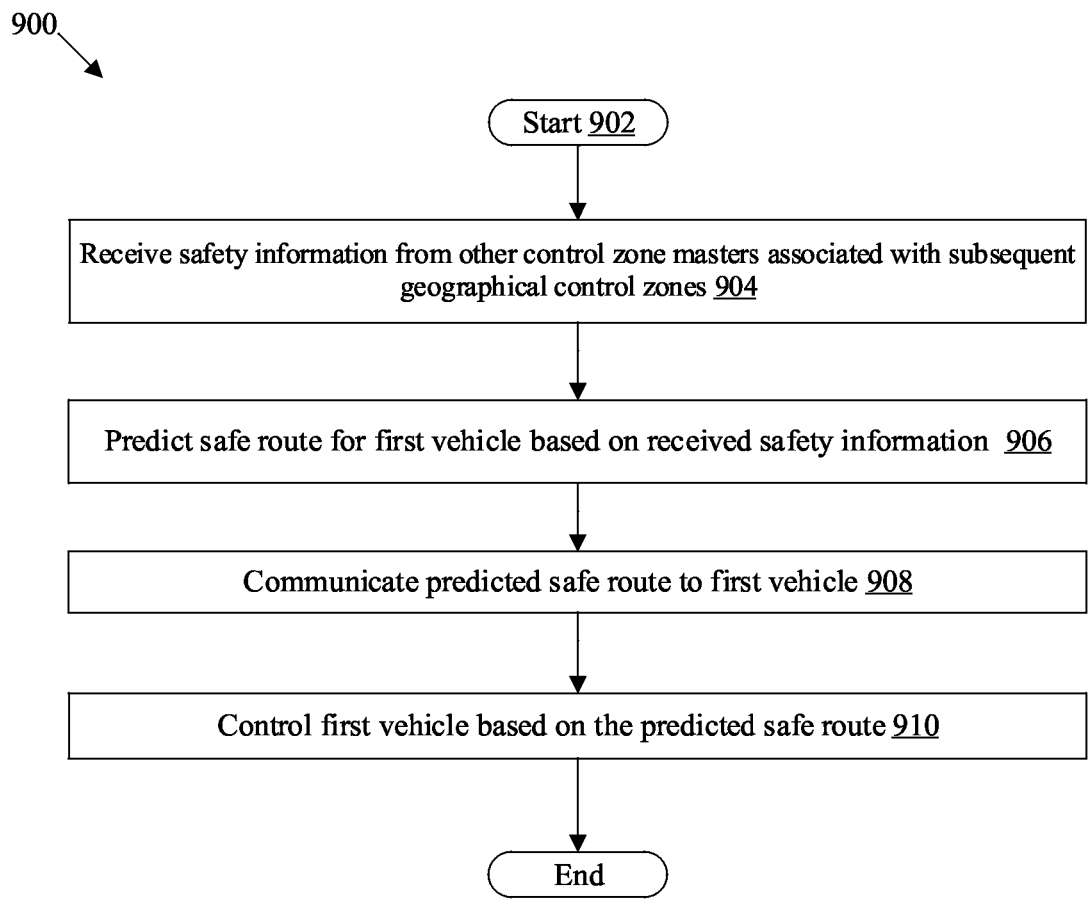
FIG. 9 is a flowchart that illustrates exemplary operations for controlling first vehicle, in accordance with an embodiment of the disclosure.

FIG. 9 is a flowchart that illustrates exemplary operations for controlling first vehicle, in accordance with an embodiment of the disclosure. FIG. 9 is explained in conjunction with elements from FIGS. 1, 2, 3, 4, 5, 6, 7A, 7B and 8. With reference to FIG. 9, there is shown the flowchart 900. The operations from 902 to 910 may be implemented by a system, for example, the control system 108 of FIG. 2. The operations may start at 902 and proceed to 904.

At 904, safety information may be received from other control zone master(s). The safety information may be associated with subsequent geographical control zone(s) that may lie in a current travel route of the first vehicle 104. In accordance with an embodiment, the first electronic device 112 may be configured to receive the safety information. The safety information may correspond to, for example, events associated with the subsequent geographical control zone. Such events may correspond to, but not limited to, an accident, a terrorist attack, a wrecked route, a bad weather condition like a tornado or a heavy rainfall, and the like.

At 906, a safe route for the first vehicle 104 may be predicted based on the received safety information. In accordance with an embodiment, the first electronic device 112 may be configured to predict the safe route for the first vehicle 104 based on the received safety information. The safe route may be a preemptive measure to avoid an encounter of the first vehicle 104 with such events and to ensure that the first vehicle 506 remains safe in course of the journey.

At 908, the predicted safe route may be communicated to the first vehicle 104. In accordance with an embodiment, the first electronic device 112 may be configured to communicate the predicted safe route to the first vehicle 104.

At 910, the first vehicle 104 may be controlled based on the predicted safe route. In accordance with an embodiment, the first electronic device 112 may be configured to control the first vehicle 104 based on the predicted safe route. For example, the predicted safe route may override the current travel route of the first vehicle 104 and the first vehicle 104 may adjust its self-driving controls so that it moves along the predicted safe route. Control may pass to end.

Various embodiments of the disclosure may provide a non-transitory computer readable medium and/or storage medium having stored thereon, instructions executable by a machine and/or a computer to operate a control system. The instructions may cause the machine and/or computer to perform operations that include a receipt of traffic information, including a plurality of image frames of a group of moving objects in a geographical control zone from one or more electronic devices of the set of electronic devices. The operations may further include generation of a set of images frames of a first moving object of the group of moving objects based on application of a trained NN model on the received traffic information. The generated set of image frames corresponds to a set of likely positions of the first moving object at a future time instant. The operations may further include prediction of an unsafe behavior of the first moving object based on the generated set of image frames and generation of first control information including an alternate route for a first vehicle in the geographical control zone based on the predicted unsafe behavior. The first vehicle may be controlled on the basis of the generated first control information.

Exemplary aspects of the disclosure may include a control system (such as the control system 108 of FIG. 1) that includes a first electronic device (such as the first electronic devices 112 of FIG. 1). The first electronic device may include circuitry (such as the circuitry 202). The circuitry may be further configured to receive traffic information including a plurality of image frames of a group of moving objects in a geographical control zone. The traffic information may also include, for example, GNSS information for a plurality of locations in the geographical control zone. The circuitry may be further configured to generate a set of images frames of a first moving object of the group of moving objects based on application of a trained NN model on the received traffic information. The generated set of image frames may correspond to a set of likely positions of the first moving object at a future time instant. The circuitry may be further configured to predict the unsafe behavior of the first moving object based on the generated set of image frames and generate first control information, including, but not limited to, an alternate route for a first vehicle (such as the first vehicle 104 of FIG. 1) in the geographical control zone based on the predicted unsafe behavior. The first vehicle may be controlled based on the generated first control information.

In accordance with an embodiment, the circuitry may be configured to determine motion information, such as one or more of a moving direction, a moving speed, a driving pattern, a driving lane, and a driving side, of the group of moving objects based on the received traffic information. The unsafe behavior of the first moving object may be predicted further based on the determined motion information. The predicted unsafe behavior may correspond to, for example, a violation of a traffic rule by the first moving object.

In accordance with an embodiment, the circuitry may be configured to determine a likelihood of collision of the first vehicle with the first moving object based on the generated set of image frames and predict the unsafe behavior of the first moving object based on the determined likelihood of collision.

In accordance with an embodiment, the circuitry may be configured to detect the first vehicle based on the first vehicle is in a communication range of the control system. The circuitry may be configured to receive an input corresponding to an acceptance to set up the geographical control zone, which may span up to a defined distance from the detected first vehicle. The circuitry may be further configured to establish the geographical control zone around the detected first vehicle based on the received input.

In accordance with an embodiment, the circuitry may be further configured to register a set of vehicles in the geographical control zone, including but not limited to, the first vehicle on a control network and generate second control information for each vehicle of the registered set of vehicles based on the predicted unsafe behavior. The circuitry may be further configured to communicate the generated second control information to each vehicle of the registered set of vehicles In accordance with an embodiment, the circuitry may be further configured to generate third control information, including but not limited to, a set of safety-measures for the first moving object based on a determination that the first moving object is a vehicle registered on the control network. The circuitry may be further configured communicate the third control information to the first moving object.

In accordance with an embodiment, the control system may include a set of electronic devices (such as the set of electronic devices 114) communicatively coupled to the first electronic device. The circuitry may be configured to select a second electronic device, from the set of electronic devices, as a first control zone master in the geographical control zone. The first control zone master may be configured to collect the traffic information of the group of moving objects in the geographical control zone. The first control zone master may be configured to collect the traffic information of the group of moving objects in the geographical control zone and share the collected traffic information with at least one electronic device of the set of electronic devices based on a retrieval request.

In accordance with an embodiment, the circuitry may be configured to predict the unsafe behavior of the first moving object while the first moving object is absent from a field of view (FOV) of the first vehicle. Alternatively, the circuitry may be configured to predict the unsafe behavior of the first moving object while the first moving object is in a field of view (FOV) of the first vehicle.

In accordance with an embodiment, the circuitry may be configured to predict a first travel route of the first moving object based on the predicted unsafe behavior. The predicted unsafe behavior may correspond to a violation of at least one traffic rule by the first moving object. The circuitry may be further configured to determine a current travel route of the first vehicle and a likelihood of collision of the first vehicle with the first moving object based on the predicted first travel route and the determined current travel route. The first control information, including the alternate route for the first vehicle may be further generated based on the determined likelihood.

In accordance with an embodiment, the circuitry may be further configured to receive safety information associated with a subsequent geographical control zone which lies in a current travel route of the first vehicle. The safety information may correspond to an event associated with the subsequent geographical control zone. The circuitry may be further configured to predict a safe route for the first vehicle based on the received safety information. The circuitry may be further configured to generate fourth control information, including the predicted safe route. The first vehicle may be further controlled based on the generated fourth information.

In accordance with an embodiment, the circuitry may be further configured to determine one or more safe driving zones for the first vehicle. The circuitry may be further configured to predict a safe route for the first vehicle based on the determined one or more safe driving zones. The circuitry may be further configured to generate fourth control information, including the predicted safe route. The first vehicle may be further controlled based on the generated fourth information while overriding a current travel route preset on the first vehicle.

In accordance with an embodiment, the set of electronic devices may include a drone on the first vehicle. The circuitry may be configured to dispatch the drone to a location of the first moving object of the group of moving objects. The first moving object may be absent from a field of view (FOV) of the first vehicle and the drone may be configured to capture the traffic information of the first moving object. The circuitry may be further configured to receive the captured traffic information from the drone.

In accordance with an embodiment, the set of electronic devices may include a drone on the first vehicle. The circuitry may be configured to detect a user discomfort level for the first vehicle and dispatch the drone further based on the detected user discomfort level.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A control system, comprising:
    a first electronic device that comprises circuitry configured to:
        receive traffic information that comprises a plurality of image frames, wherein the plurality of image frames is associated with a group of moving objects in a geographical control zone;
        generate a set of image frames of the plurality of image frames based on application of a trained neural network (NN) model on the received traffic information, wherein
            the generated set of image frames is associated with a moving object of the group of moving objects, and
            the generated set of image frames corresponds to a set of positions associated with the moving object at a specific time instant;
        determine an unsafe behavior of the moving object based on the generated set of image frames, wherein the determined unsafe behavior is one of an avoidable collision or an unavoidable collision;
        generate first control information based on the determined unsafe behaviour is the avoidable collision, wherein the first control information comprises an alternate route for a specific vehicle in the geographical control zone;
        control the specific vehicle based on the generated first control information; and
        control, based on the determined unsafe behavior is the unavoidable collision, a safety hardware associated with the specific vehicle.

2. The control system according to claim 1, wherein the moving object is a moving vehicle.

3. The control system according to claim 1, wherein the moving object is one of a pedestrian, an animal, an aerial vehicle, a flying debris, or a human.

4. The control system according to claim 1, wherein the circuitry is further configured to:
    detect the specific vehicle based on the specific vehicle is in a communication range of the control system;
    receive, from the detected specific vehicle, an input that corresponds to an acceptance associated with the geographical control zone, wherein the geographical control zone spans up to a defined distance; and
    establish, based on the received input, the geographical control zone in a specific vicinity of the detected specific vehicle.

5. The control system according to claim 1, further comprising a set of electronic devices configured to communicatively couple with the first electronic device, wherein
    the circuitry is further configured to receive the traffic information from at least one of the set of electronic devices, and
    the set of electronic devices comprises a vehicle, an in-vehicle Electronic Control Unit (ECU), an in-vehicle camera, an external vehicle camera, a road side unit (RSU), a Vehicle-to-Infrastructure (V2I) communication device, and a camera drone.

6. The control system according to claim 1, wherein
    the traffic information further comprises Global Navigation Satellite System (GNSS) information, and
    the GNSS information is associated with a plurality of locations in the geographical control zone.

7. The control system according to claim 1, wherein the circuitry is further configured to:
    determine motion information of the group of moving objects based on the received traffic information; and
    determine the unsafe behavior of the moving object based on the determined motion information.

8. The control system according to claim 7, wherein the motion information comprises at least one of a moving direction, a moving speed, a driving pattern, a driving lane, or a driving side of a road.

9. The control system according to claim 1, wherein determined unsafe behavior corresponds to a violation of a traffic rule by the moving object.

10. The control system according to claim 1, wherein
    the circuitry is further configured to register a set of vehicles that comprises the specific vehicle on a control network, and
    the registered set of vehicles are in the geographical control zone.

11. The control system according to claim 10, wherein the circuitry is further configured to:
    generate second control information for each vehicle of the registered set of vehicles, wherein the second control information is based on the determined unsafe behavior; and
    communicate the generated second control information to each vehicle of the registered set of vehicles.

12. The control system according to claim 10, wherein the circuitry is further configured to:
    generate, based on the moving object is a vehicle registered on the control network, second control information that comprises a set of safety-measures for the moving object; and
    communicate the generated second control information to the moving object.

13. The control system according to claim 1, further comprising a set of electronic devices configured to communicatively couple with the first electronic device, wherein
    the circuitry is further configured to select, from the set of electronic devices, a second electronic device,
    the second electronic device corresponds to a first zone master of the geographical control zone, and
    the first zone master is configured to:
        collect the traffic information of the group of moving objects in the geographical control zone;
        receive a retrieval request from at least one of the set of electronic devices, wherein the retrieval request is associated with the collected traffic information; and
        transmit the collected traffic information to at least one of the set of electronic devices based on the received retrieval request.

14. The control system according to claim 1, wherein the circuitry is further configured to determine the unsafe behavior of the moving object based on an absence of the moving object from a field-of-view (FOV) of the specific vehicle.

15. The control system according to claim 1, wherein the circuitry is further configured to determine the unsafe behavior of the moving object based on the moving object is in a field-of-view (FOV) of the specific vehicle.

16. The control system according to claim 1, wherein the circuitry is further configured to:
    determine a likelihood of one of the avoidable collision or the unavoidable collision based on the generated set of image frames, wherein each of the avoidable collision and the unavoidable collision is between the specific vehicle and the moving object; and
    determine the unsafe behavior of the moving object based on the determined likelihood.

17. The control system according to claim 1, wherein the circuitry is further configured to:
    determine a first travel route of the moving object based on the determined unsafe behavior, wherein the determined unsafe behavior corresponds to a violation of at least one traffic rule by the moving object;
    determine a current travel route of the specific vehicle;
    determine a likelihood of one of the avoidable collision or the unavoidable collision based on the determined first travel route and the determined current travel route, wherein each of the avoidable collision and the unavoidable collision is between the specific vehicle and the moving object; and
    generate the first control information based on the determined likelihood, wherein the generated first control information comprises the alternate route for the specific vehicle.

18. The control system according to claim 1, wherein the circuitry is further configured to:
    receive safety information associated with a subsequent geographical control zone in a current travel route of the specific vehicle, wherein the safety information corresponds to an event associated with the subsequent geographical control zone;
    determine a safe route for the specific vehicle based on the received safety information;
    generate second control information that comprises the determined safe route; and
    control the specific vehicle based on the generated second control information.

19. The control system according to claim 1, wherein the circuitry is further configured to:
    determine at least one safe driving zone for the specific vehicle;
    determine a safe route for the specific vehicle based on the at least one determined safe driving zone;
    generate second control information that comprises the determined safe route; and
    control the specific vehicle based on
        the generated second control information, and
        a current travel route overridden on the specific vehicle.

20. The control system according to claim 1, further comprising a drone on the specific vehicle, wherein the circuitry is further configured to:
    dispatch the drone to a location of the moving object, wherein
        the moving object is absent from a field-of-view (FOV) of the specific vehicle, and
        the drone is configured to capture the traffic information of the moving object; and
    receive the captured traffic information from the drone.

21. The control system according to claim 20, wherein the circuitry is further configured to:
    detect a user discomfort level for the specific vehicle; and
    dispatch the drone based on the detected user discomfort level.

22. A method, comprising:
    receiving traffic information that comprises a plurality of image frames, wherein the plurality of image frames is associated with a group of moving objects in a geographical control zone;
    generating a set of image frames of the plurality of image frames based on application of a trained neural network (NN) model on the received traffic information, wherein the generated set of image frames is associated with a moving object of the group of moving objects, and the generated set of image frames corresponds to a set of positions associated with the moving object at a specific time instant;

determining an unsafe behavior of the moving object based on the generated set of image frames, wherein the determined unsafe behavior is one of an avoidable collision or an unavoidable collision;

generating first control information based on the determined unsafe behavior is the avoidable collision, wherein the first control information comprises an alternate route for a specific vehicle in the geographical control zone;

controlling the specific vehicle based on the generated first control information; and controlling, based on the determined unsafe behavior is the unavoidable collision, a safety hardware associated with the specific vehicle.

* * * * *